(12) United States Patent
Meinig

(10) Patent No.: US 6,934,714 B2
(45) Date of Patent: Aug. 23, 2005

(54) METHOD AND SYSTEM FOR IDENTIFICATION AND MAINTENANCE OF FAMILIES OF DATA RECORDS

(75) Inventor: Kelly Meinig, Seattle, WA (US)

(73) Assignee: Intelesis Engineering, Inc., Seattle, WA (US)

( * ) Notice: Subject to any disclaimer, the term of this patent is extended or adjusted under 35 U.S.C. 154(b) by 704 days.

(21) Appl. No.: 10/091,378

(22) Filed: Mar. 4, 2002

(65) Prior Publication Data

US 2003/0167253 A1 Sep. 4, 2003

(51) Int. Cl.$^7$ ................................................ G06F 7/00
(52) U.S. Cl. ........................... 707/102; 707/3; 707/101
(58) Field of Search .......................... 707/1–4, 7–10, 707/100–104.1, 200–205; 711/100, 101, 111–114; 714/1, 2, 15, 20; 360/39, 48

(56) References Cited

U.S. PATENT DOCUMENTS

| | | | |
|---|---|---|---|
| 5,628,004 A | 5/1997 | Gormley et al. | ............ 395/615 |
| 5,806,057 A | 9/1998 | Gormley et al. | ................ 707/1 |
| 6,115,690 A | 9/2000 | Wong | ............................. 705/7 |
| 6,212,527 B1 * | 4/2001 | Gustman | .................... 707/102 |
| 6,240,411 B1 | 5/2001 | Thearling | ...................... 707/5 |
| 6,446,092 B1 * | 9/2002 | Sutter | .......................... 707/203 |

OTHER PUBLICATIONS

*GoldMine 5.0 Manual*, GoldMine Software Corporation, Apr. 2000.

* cited by examiner

Primary Examiner—G. Robinson
Assistant Examiner—Harold E. Dodds, Jr.
(74) Attorney, Agent, or Firm—Seed IP Law Group PLLC

(57) ABSTRACT

Methods and systems for managing data records through a concept of families are provided. Example embodiments provide an enhanced record management system, a Data Family Record Management System ("DFRMS"), which maintains families of data. In one embodiment, the DFRMS comprises a command interface, an auto de-duplication engine, a query engine, and one or more data repositories. The DFRMS automatically processes imported data to insure a clean data repository and the management of the families of data. Each new data record is normalized, automatically inspected for related data records, automatically de-duped, and then added to a family when appropriate. Related data records can be directly related or indirectly related, for example, through multiply nested, embedded relationships. Once established, the family associations in the data repository are used to retrieve data records in response to user queries, such as to retrieve only a selected set of records from each family or from a selected set of families.

50 Claims, 26 Drawing Sheets

Table 1: Results After Direct Check of New Record
Summary: Record 9 located Record 1 (by Phone), Records 7 and 8 (by Address) and Record 4 by NameState

| # | NameState | Address | Phone | Common Phone | Common Location | Family | Source of Match |
|---|---|---|---|---|---|---|---|
| 1 | Fuel Processors, WA | 701 First Avenue | 367-3319 | 1 | | 51 | Phone |
| 2 | Fuel Processors, WA | 12521 90th Street NW | 526-6149 | 2 | | 51 | |
| 3 | Fuel Processors, WA | 222 15th Avenue NE | 555-1212 | 1 | 8 | 51 | |
| 4 | Oil Re-Refining, WA | 345 Center Street | 526-6149 | 2 | 8 | 51 | NameState |
| 5 | John's Oil-Refining, WA | 222 15th Avenue | 555-1212 | | | 51 | |
| 6 | John's Oil-Refining, WA | 1600 Oak Tree Road | 614-8200 | | | 51 | |
| 7 | John's Oil Pickup, WA | 11750 33rd Place | 417-6000 | | 33 | 7 | Address |
| 8 | John's Service, WA | 11750 33rd Place | 417-3251 | | 33 | 7 | Address |
| 9 | Oil Re-Refining, WA | 11750 33rd Place | 367-3319 | | | | NEW RECORD |

Table 2: Potential Family List (Found Set) After Direct Check
(Sorted by NameState)

| # | NameState | Phone | Common Phone | Common Location | Family | Source of Match | Potential Family | Record to Check | Found Order |
|---|---|---|---|---|---|---|---|---|---|
| 1 | Fuel Processors, WA | 367-3319 | | | 51 | Phone | Yes | 1 | 1 |
| 7 | John's Oil Pickup, WA | 417-6000 | | 33 | 7 | Address | Yes | 1 | 2 |
| 8 | John's Service, WA | 417-3251 | | 33 | 7 | Address | Yes | 1 | 3 |
| 4 | Oil Re-Refining, WA | 526-6149 | 1 | | 51 | NameState | Yes | 1 | 4 |
| 9 | Oil Re-Refining, WA | 367-3319 | | | | NEW RECORD | Yes | 1 | 5 |

Fig. 11

Table 3: Results After Direct Check of Records in Table 2

Results After Loop 1
Summary: Record 1 located Record 9 (by Phone), Record 2 (by NameState) and Record 3 (by NameState), marks them as Potential Family members, and adds them to the end of the list. ⟵1201

| # | NameState | Address | Phone | Common Phone | Common Location | Family | Source of Match | Potential Family | Record to Check | Found Order |
|---|---|---|---|---|---|---|---|---|---|---|
| 1 | Fuel Processors, WA | 701 First Avenue | 367-3319 | | | 51 | Record to Check | Yes | 1 | 1 |
| 7 | John's Oil Pickup, WA | 11750 33rd Place | 417-6000 | | 33 | 7 | | Yes | 1 | 2 |
| 8 | John's Service, WA | 11750 33rd Place | 417-3251 | | 33 | 7 | | Yes | 1 | 3 |
| 4 | Oil Re-Refining, WA | 345 Center Street | 526-6149 | | | 51 | | Yes | 1 | 4 |
| 9 | Oil Re-Refining, WA | 11750 33rd Place | 367-3319 | 1 | | | Phone | Yes | 1 | 5 |
| 2 | Fuel Processors, WA | 12521 30th Street NW | 526-6149 | 1 | | 51 | NameState | Yes | 1 | 6 |
| 3 | Fuel Processors, WA | 222 15th Avenue | 555-1212 | 2 | 9 | 51 | NameState | Yes | 1 | 7 |

Subsequent Results:
Summary Loop 2: Record 7 located Record 8 (by Address) and Record 9 (by Address), both previously found. Seeing that a Common Location ID has been already been assigned to this record (indicating there are already at least two records with this Address), the Common Location number is copied over to other records with the same Address that have an empty Common Location field, e.g. Record 9.
Summary Loop 3: Record 8 located Record 7 (by Address) and Record 9 (by Address), both previously found.
Summary Loop 4: Record 4 located Record 2 (by Phone) and Record 9 (by NameState), both previously found.
Summary Loop 5: Record 9 located Record 1 (by Phone), Record 7 (by Address) and Record 9 (by Address), all previously found.

*Fig. 12*

Results After Indirect Search

Table 4: Results After Loop 1
Summary: Record 1 located Record 9 (by Phone), previously found.

*1701*

| # | Name,State | Address | Phone | Common Phone | Common Location | Family | Source of Match | Potential Family | Record to Check | Found Order |
|---|---|---|---|---|---|---|---|---|---|---|
| 1 | Fuel Processors, WA | 701 First Avenue | 367-3319 | | | 51 | Record to Check | Yes | 1 | 1 |
| 7 | John's Oil Pickup, WA | 11750 33rd Place | 417-6000 | | 33 | 7 | | Yes | 1 | 2 |
| 8 | John's Service, WA | 11750 33rd Place | 417-3251 | | 33 | 7 | | Yes | 1 | 3 |
| 4 | Oil Re-Refining, WA | 345 Center Street | 526-6149 | 1 | | 51 | | Yes | 1 | 4 |
| 9 | Oil Re-Refining, WA | 11750 33rd Place | 367-3319 | | | | Phone | Yes | 1 | 5 |
| 2 | Fuel Processors, WA | 12521 30th Street NW | 526-6149 | 1 | 9 | 51 | | Yes | 1 | 6 |
| 3 | Fuel Processors, WA | 222 15th Avenue | 555-1212 | 2 | | 51 | | Yes | 1 | 7 |

Table 5: Subsequent Results
Note: Refer to Table 1 above for a complete list.
Summary Loop 2: Record 7 located Record 8 (by Address) and Record 9 (by Address), both previously found. Seeing that a Common Location ID has been assigned to this record, the Common Location number is copied over to other records with the same Address that have an empty Common Location field, e.g. Record 9.
Summary Loop 3: Record 8 located Record 7 (by Address) and Record 9 (by Address), both previously found.
Summary Loop 4: Record 4 located Record 2 (by Phone), previously found.
Summary Loop 5: Record 9 located Record 1 (by Phone), Record 7 (by Address) and Record 9 (by Address), all previously found.
Summary Loop 6: Record 2 located Record 4 (by Phone), previously found.
Summary Loop 7: Record 3 located Record 5 (by Phone and Address), a new record and adds it to the bottom of the list.

*1702*

| # | Name,State | Address | Phone | Common Phone | Common Location | Family | Source of Match | Potential Family | Record to Check | Found Order |
|---|---|---|---|---|---|---|---|---|---|---|
| 1 | Fuel Processors, WA | 701 First Avenue | 367-3319 | | | 51 | | Yes | 7 | 1 |
| 7 | John's Oil Pickup, WA | 11750 33rd Place | 417-6000 | | 33 | 7 | | Yes | 7 | 2 |
| 8 | John's Service, WA | 11750 33rd Place | 417-3251 | | 33 | 7 | | Yes | 7 | 3 |
| 4 | Oil Re-Refining, WA | 345 Center Street | 526-6149 | | | 51 | | Yes | 7 | 4 |
| 9 | Oil Re-Refining, WA | 11750 33rd Place | 367-3319 | | 33 | 51 | | Yes | 7 | 5 |
| 2 | Fuel Processors, WA | 12521 30th Street NW | 526-6149 | 1 | 9 | 51 | | Yes | 7 | 6 |
| 3 | Fuel Processors, WA | 222 15th Avenue | 555-1212 | 2 | 9 | 51 | Record to Check | Yes | 7 | 7 |
| 5 | John's Oil-Refining, WA | 222 15th Avenue | 555-1212 | 2 | 9 | 51 | Phone and Address | Yes | 7 | 8 |

*Fig. 17*

Table 6: Complete Results After Loop 8 of Indirect Search
Summary: Record 5 located Record 3 (by Phone), previously found, and the loop ends.

| # | Name/State | Address | Phone | Common Phone | Common Location | Common Family | Source of Match | Potential Family | Record to Check | Found Order |
|---|---|---|---|---|---|---|---|---|---|---|
| 1 | Fuel Processors, WA | 701 First Avenue | 367-3319 | | | 51 | | Yes | 8 | 1 |
| 7 | John's Oil Pickup, WA | 11750 33rd Place | 417-6000 | | 33 | 7 | | Yes | 8 | 2 |
| 8 | John's Service, WA | 11750 33rd Place | 417-3251 | | 33 | 7 | | Yes | 8 | 3 |
| 4 | Oil Re-Refining, WA | 345 Center Street | 526-6149 | 1 | | 51 | | Yes | 8 | 4 |
| 9 | Oil Re-Refining, WA | 11750 33rd Place | 367-3319 | | 33 | | | Yes | 8 | 5 |
| 2 | Fuel Processors, WA | 12521 30th Street NW | 526-6149 | 1 | | 51 | | Yes | 8 | 6 |
| 3 | Fuel Processors, WA | 222 15th Avenue | 555-1212 | 2 | 9 | 51 | Phone | Yes | 8 | 7 |
| 5 | John's Oil-Refining, WA | 222 15th Avenue | 555-1212 | 2 | 9 | 51 | Record to Check | Yes | 8 | 8 |

*Fig. 18*

Table 7: Alternative: Using NameState in the Embedded Search
Note: NameState is not included in the Embedded Search loop as shown herein, although it can be. In this case, in the event that a Record 6 exists that matches Record 5 only off of the NameState, Record 6 would not have been located by the Embedded Search on Record 5. The reasoning behind excluding the NameState in the Embedded Search is due to the extended relationship of Record 6 to the original set of records being searched on. It is, at this point, fairly removed and the Family ID loses some meaning. While this is not a common occurrence, a final loop searching off of the Families present in the final set of found records can find any remaining missing family members, thus picking up Record 6 if desired. Alternatively, the NameState can be included in the Embedded Search.

| # | NameState | Address | Phone | Common Phone | Common Location | Common Family | Source of Match | Potential Family | Record to Check | Found Order |
|---|---|---|---|---|---|---|---|---|---|---|
| 1 | Fuel Processors, WA | 701 First Avenue | 367-3319 | | | 51 | | Yes | 9 | 1 |
| 7 | John's Oil Pickup, WA | 11750 33rd Place | 417-6000 | | 33 | 7 | | Yes | 9 | 2 |
| 8 | John's Service, WA | 11750 33rd Place | 417-3251 | | 33 | 7 | | Yes | 9 | 3 |
| 4 | Oil Re-Refining, WA | 345 Center Street | 526-6149 | | | 51 | | Yes | 9 | 4 |
| 9 | Oil Re-Refining, WA | 11750 33rd Place | 367-3319 | | 33 | | | Yes | 9 | 5 |
| 2 | Fuel Processors, WA | 12521 30th Street NW | 526-6149 | 1 | | 51 | | Yes | 9 | 6 |
| 3 | Fuel Processors, WA | 222 15th Avenue | 555-1212 | 2 | 9 | 51 | | Yes | 9 | 7 |
| 5 | John's Oil-Refining, WA | 222 15th Avenue | 555-1212 | 2 | 9 | 51 | Record to Check | Yes | 9 | 8 |
| 6 | John's Oil-Refining, WA | 1600 Oak Tree Road | 614-9200 | | | 51 | | Yes | 9 | 9 |

Fig. 19

Automatic De-Duplication

Table 8: Results After Dedup
Summary: Common Phone IDs are assigned to Records 1 and 9.

| # | NameState | Address | Phone | Common Phone | Common Location | Common Family | Source of Match | Potential Family | Record to Check | Found Order |
|---|---|---|---|---|---|---|---|---|---|---|
| 1 | Fuel Processors, WA | 701 First Avenue | 367-3319 | 3 | | 51 | | Yes | 9 | 1 |
| 7 | John's Furnace Repair, WA | 11750 33rd Place | 417-6000 | | 33 | 7 | | Yes | 9 | 2 |
| 8 | John's Service, WA | 11750 33rd Place | 417-3251 | | 33 | 7 | | Yes | 9 | 3 |
| 4 | Oil Re-Refining, WA | 345 Center Street | 526-6149 | 1 | | 51 | | Yes | 9 | 4 |
| 9 | Oil Re-Refining, WA | 11750 33rd Place | 367-3319 | 3 | 33 | | | Yes | 9 | 5 |
| 2 | Fuel Processors, WA | 12521 30th Street NW | 526-6149 | 1 | | 51 | | Yes | 9 | 6 |
| 3 | Fuel Processors, WA | 222 15th Avenue | 555-1212 | 2 | 9 | 51 | | Yes | 9 | 7 |
| 5 | John's Oil-Refining, WA | 222 15th Avenue | 555-1212 | 2 | 9 | 51 | NameState | Yes | 9 | 8 |
| 6 | John's Oil-Refining, WA | 1600 Oak Tree Road | 614-9200 | | | 51 | Record to Check | Yes | 9 | 9 |

Fig. 21

Table 9: Marriage (Coalescing Families)
Summary: Family 51 and Family 7 are joined by the new record.                                                2301

| # | NameState | Address | Phone | Common Phone | Common Location | Family | Source of Match | SIC Group | Alt Phone |
|---|---|---|---|---|---|---|---|---|---|
| 1 | Fuel Processors, WA | 701 First Avenue | 367-3319 | | | 51 | Phone | 29 | |
| 2 | Fuel Processors, WA | 12521 30th Street NW | 526-6149 | 1 | | 51 | | 29 | |
| 3 | Fuel Processors, WA | 222 15th Avenue NE | 555-1212 | 2 | | 51 | | 29 | |
| 4 | Oil Re-Refining, WA | 345 Center Street | 526-6149 | 1 | | 51 | | 29 | Match |
| 5 | John's Oil-Refining, WA | 222 15th Avenue NE | 555-1212 | 2 | | 51 | NameState | 29 | |
| 6 | John's Oil-Refining, WA | 1600 Oak Tree Road | 614-9200 | | 9 | 51 | | 29 | |
| 9 | Oil Re-Refining, WA | 11750 33rd Place | 367-3319 | | 9 | 51 | NEW RECORD | 29 | |
| 7 | John's Oil Pickup, WA | 11750 33rd Place | 417-6000 | | 33 | 7 | | 29 | |
| 8 | John's Service, WA | 11750 33rd Place | 417-3251 | | 33 | 7 | | 29 | Match |

Fig. 23

Table 10: Unrelated Families
Summary: Family 7 is inappropriately marked by the new record. A Family is not assigned.

| # | NameState | Address | Phone | Common Phone | Common Location | Family | Source of Match | SIC Group | Alt Phone |
|---|---|---|---|---|---|---|---|---|---|
| 1 | Fuel Processors, WA | 701 First Avenue | 367-3319 | | | 51 | Phone | 29 | |
| 2 | Fuel Processors, WA | 12521 30th Street NW | 526-8149 | 1 | | 51 | | 29 | |
| 3 | Fuel Processors, WA | 222 15th Avenue NE | 555-1212 | 2 | 8 | 51 | | 29 | |
| 4 | Oil Re-Refining, WA | 345 Center Street | 526-6149 | 1 | | 51 | NameState | 29 | |
| 5 | John's Oil-Refining, WA | 222 15th Avenue NE | 555-1212 | 2 | 8 | 51 | | 29 | |
| 6 | John's Oil-Refining, WA | 1600 Oak Tree Road | 614-9200 | | | 51 | | 29 | |
| 9 | Oil Re-Refining, WA | 1000 Main Street | 367-3319 | | | | NEW RECORD | 29 | |
| 7 | Ace Hardware, WA | 1000 Main Street | 417-6000 | | 33 | 7 | | 30 | |
| 8 | Ace Engineering, WA | 1000 Main Street | 262-8877 | | 33 | 7 | | 87 | |

METHOD AND SYSTEM FOR IDENTIFICATION AND MAINTENANCE OF FAMILIES OF DATA RECORDS

BACKGROUND OF THE INVENTION

1. Field of the Invention

The present invention relates to a method and system for identifying relationships among data records in a data repository and, in particular, to methods and systems for automatically determining data records that are related in a direct, or embedded manner and automatically removing duplicate data records.

2. Background Information

Very large databases are often plagued by a problem of the presence of duplicate data records, which can prove quite costly to manufactures, vendors, and other companies who distribute literature or products or who contact individuals based upon the presence of records in a database. For example, marketers attempting to target an audience with a promotional offer may end up spending unnecessary funds by sending duplicate marketing literature to multiple persons in the same business or household. A potentially larger problem is the annoyance factor to the recipients of the literature, who, upon receiving multiple copies of the same literature, may respond adversely and ignore the literature, thus defeating its intended purpose. As another example, multiple records of the same content inadvertently stored under minor variations of a field used to index the records may cause the data to be difficult to retrieve. For instance, duplicate billing charges to a customer's account, when the account information is not entered consistently, could end up being difficult if not impossible to track when the customer calls to question charges reflected on an invoice. There are many other examples of similar problems arising from an inability to correctly detect and remove duplicates in a practical sense, especially when the data is related but not identical.

Current systems for removing duplicates from a database are limited to matching the values of one or more fields. How uniformly the data is entered affects the successfulness of such matches greatly. Also, the process for removing duplicates is to post-process records in the database after incorrect information has already been entered. Once incorrect information has been entered, it is typically more difficult to detect and clean out. Moreover, much of the de-duplication process is performed manually, by comparing one data record against another; if the correct two records aren't compared, a duplicate may go undetected. The larger or more diverse the database, the more complex and time intensive the problem of detecting and removing duplicates.

BRIEF SUMMARY OF THE INVENTION

Embodiments of the present invention provide computer- and network-based methods and systems for managing data records through a concept of families. A "family," as used herein, is a way to identify a plurality of data records that are related to each other either directly or indirectly, in some type of embedded manner. Example embodiments provide an enhanced record management system, the Data Family Record Management System ("DFRMS"), which provides support for automatically maintaining, whenever possible, a data repository of records in a "clean" (duplication free) state whenever new data records are added to the repository. In addition, the DFRMS examines all new records in the data repository for related records and automatically identifies appropriate families and associates them with the data records. The family associations are then used to response to queries.

In one embodiment, the DFRMS indicates a family relationship between a plurality of data records by automatically determining a set of records that relate directly or indirectly to a designated record, adding the data record to the repository after determining that it is not a duplicate of an existing related record, and automatically associating each record of the determined set with an indication of the family relationship. In another embodiment, multiple family relationships are indicated. In one embodiment, the determination of whether records relate directly or indirectly is based upon a plurality of designated fields. In one such embodiment, the fields used for comparison are configurable. In another embodiment the fields include a name, address, and/or phone number. In yet another embodiment, data records are normalized according to a set of conventions prior to determining related records. In one embodiment, these conventions are configurable. In another embodiment, the imported data is normalized according to a table-driven set of conventions. In one embodiment, these conventions include substitution of one field value for another.

In one embodiment, the related records include records that are related indirectly through multiple levels of embedding. In one such embodiment, these records are determined by examining the related records for each record progressively as each related record is determined, until no more related records are determined.

In another embodiment, the indicated family relationships are used to automatically retrieve a set of related data records. In one embodiment, these related records are used to automatically determine all data records that related to a specified value of a particular field. In another embodiment, the related records are used to automatically determine a set of locations to which to distribute some type of object. In one of these embodiments, the object is a marketing tool. In another of these embodiments, it is a sales catalog. In yet another one of these embodiments, it is a trial product. In one embodiment, the automatically determined locations are used to support a direct mailing process. In another embodiment, the determined locations are used to control the number of duplicate objects sent to a single physical address. In yet another embodiment, the related records are used to automatically determine missing information from a particular data record.

In one embodiment a Data Family Record Management System comprises a command interface, an automatic de-duplication engine, a query engine, and one or more data repositories. The command interface, along with the query engine, provides a mechanism for accessing data according to family relationships. The command interface also provides techniques for configuring the auto de-duplication engine, such as specifying what fields are to be used for directly related comparisons and/or for indirectly related comparisons. It also is used to specify data to be imported.

The automatic de-duplication engine imports and manages the data records in the data repositories. In one embodiment, the auto de-duplication engine automatically maintains family relationships among data records when a new data record is entered, automatically de-duplicates and/or consolidates new records before they are entered in the data repositories, automatically merges (marries) families when a new record properly joins two sets of related data records into a bigger family, and notifies an administrator for manual verification when appropriate.

In another embodiment, the automatic de-duplication and consolidation process uses a table to determine what matching field values indicate automatic deletion or consolidation. In one such embodiment, the table represents a state diagram. In another embodiment, the fields to be used are coded into the automatic de-duplication process.

In one embodiment, two families are merged when secondary field values match. In one such embodiment, the secondary fields are fields that were not used to determine the related data records. In another embodiment, a secondary field is an SIC code. In yet another embodiment, multiple secondary fields are examined.

BRIEF DESCRIPTION OF THE DRAWINGS

FIG. 11 shows sample data and a table of example results after executing a routine for checking for direct duplicate records on the sample data.

FIG. 12 shows a table of example results after executing the routine for checking for direct duplicate records on the results from a prior invocation of the routine.

FIGS. 17 and 18 shows tables of example results after executing a routine for finding indirectly related data records.

FIG. 19 shows a table of example results after executing an alternative routine for finding indirectly related data records.

FIG. 21 shows a table of example results after executing a routine for performing auto de-duplication and consolidation of data records.

FIG. 23 shows a table of an example list of data records of different families that result in marriage into a single family.

FIG. 24 shows a table of an example list of data records of different families that do not result in a marriage of the families.

DETAILED DESCRIPTION OF THE INVENTION

Figure 1:
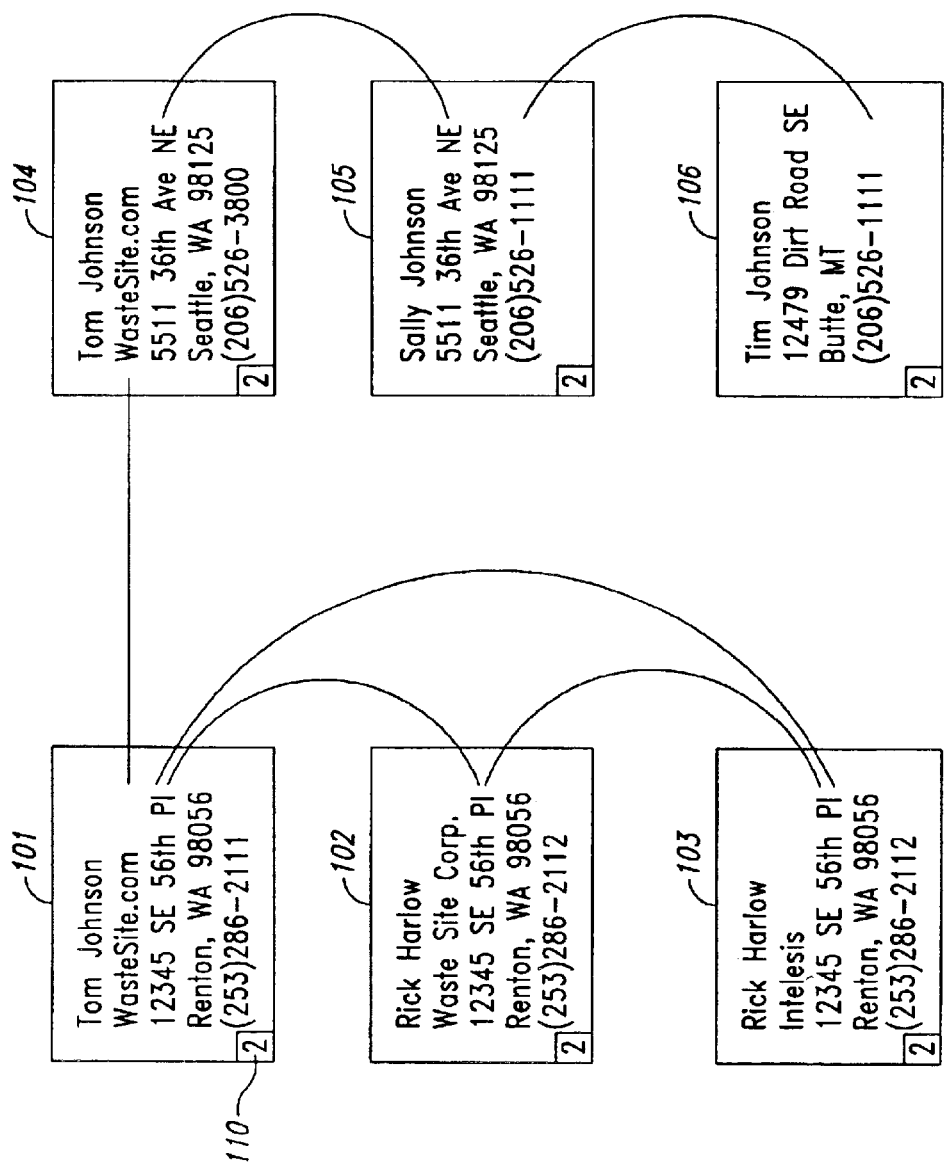
FIG. 1 is an example of a data family.

Embodiments of the present invention provide computer- and network-based methods and systems for managing data records through a concept of families. A "family," as used herein, is a way to identify a plurality of data records that are related to each other either directly or indirectly, in some type of embedded manner. For example, a first data record may contain a same address as a second data record, but not as a third data record. The second data record, in turn, may share a phone number with the third data record, thus, relating the first record with the third record in an indirect or embedded relationship. The embedded nature of a relationship can become quite complicated and span multiple levels of indirection.

Example embodiments provide an enhanced record management system, the Data Family Record Management System ("DFRMS"), which provides support for automatically maintaining, whenever possible, a data repository of records in a "clean" (duplication free) state whenever new data records are added to the repository. In addition, the DFRMS examines all new records in the data repository for relationships and automatically identifies appropriate families and associates them with the data records. Embodiments of the present invention can be used in many applications, especially those that are enhanced by automatic removal of duplicates in a data repository. For example, embodiments of the present invention have been used to maintain a highly complex network of information concerning the disposition of hazardous wastes, which contains potentially hundreds of thousands of records of companies, all requiring human communication to verify services, resources, and information. Typically, each of these records has hundreds of fields; hence, the ability to automatically de-duplicate and merge information can be quite beneficial.

In addition, embodiments of the present invention can be used to retrieve and act upon data records that are related in an indirect (possibly embedded several levels deep) manner. For example, a merchandiser may want to send catalogs to only one contact at a business address to reduce marketing costs. The concept of family relationships associated with the data can be used to retrieve more targeted mailing lists, and additionally can give the requester control over whether to send items to entities associated with all records in the family or just records with designated fields having unique values, etc.

Although this description primarily refers to data records containing contact information, such as data on a company or individual, one skilled in the art will recognize that the methods and systems described herein are applicable to any other type of content that can placed in a data record, where the field types of the data records are homogeneous across the repository. For example, the techniques described herein could be applied to data records that are related normally hierarchically. For example, in a system that provides products that can be purchased from an online grocery store, the data records may have several fields that can have indirect relationships, such as an item "parsley" might be a "dry good" but also a "fresh herb". As another example, a medical diagnosis system could be enhanced using the techniques described herein to store associations between data records containing systems, drug interactions, etc. In yet another example, a criminal investigation system could be enhanced using these techniques. The data records might contain fields such as names, aliases, nationality, drivers license no., eye color, crime statistics, blood type, genetic information, etc. The association of a "family" could be used to help identify key missing information for a particular individual, such as an address or phone number. One skilled in the art will recognize that many other applications exist.

FIG. 1 is an example of a data family. Six different data records 101–106 belonging to a single data family are shown, with some of the links between the data records evident (other links are not shown). In this example, data records 101–103 each correspond to individual contacts at a "company," which has two different business names ("dbas"), transacting business at the same address. Data records 104–106 each correspond to individual family members at the residence of one of the contacts (the contact "Tom Johnson" from record 101), from one of the businesses represented by data records 101–103. The number in the box 110 represents a family identifier that has been assigned to all of these data records, because each record relates to at least one other in a direct or indirect manner. For the sake of discussion, because Tom Johnson works part of his time at home, assume that at some point he submitted to the administrator of the data repository information regarding the name of his business (see data record 104). (A similar discussion could be indulged regarding the contact name.) Thus, data record 101 and 104 are directly related because they have a data field value in common ("Tom Johnson" or "WasteSite.com"). Data record 104 is also directly related to data record 105, which is a data record that corresponds to his spouse, but this time through the Address field, which contains the same residential address. Thus, data record 101, which corresponds to Tom's business, is indirectly related to data record 105, which corresponds to contacting Tom's spouse. Further, assume that data record 106, which corresponds to a child of Tom, although away at school, has chosen to keep his home phone number for contact purposes; thus, data record 106 is directly related to the data record that corresponds to his mother 105, and is indirectly related to the data record 104 that corresponds to his father at home and the data record 101 that corresponds to his father at work. Using similar reasoning, data records 102 and 103 are directly related to data record 101 (through the business address) and also are indirectly related to the data records 104–106, which correspond to the individuals related to Tom's residential address.

In many instances, depending upon the purpose for using the stored data records, it might be desirable to control which data records are "chosen to represent" the family. For example, in a literature distribution system, which uses the data repository to create mailing lists, it might be desirable to send mailings to only one contact per address, regardless of whether multiple businesses are doing business at that same address. Examples of this scenario include a doctor's office or hair salon, which provide shared office space to multiple (individual) businesses, and which share a waiting area. As another example, it might be desirable to use the contact field and insure that only one mailing is sent to each unique contact, regardless of where that contact is located (within a city, state perimeter). Alternatively, it might be desirable to send mailings to everyone, as long as they aren't clearly duplicative. For example, insuring that two mailings aren't sent to the same individual, for example Ms. Sally Johnson, and Sally Johnson at the same address and phone number may be desired. One skilled in the art will recognize that many other combinations of controlling retrieval or distribution flow based upon these direct and indirect relationships are possible and contemplated by the techniques described herein.

Figure 2:
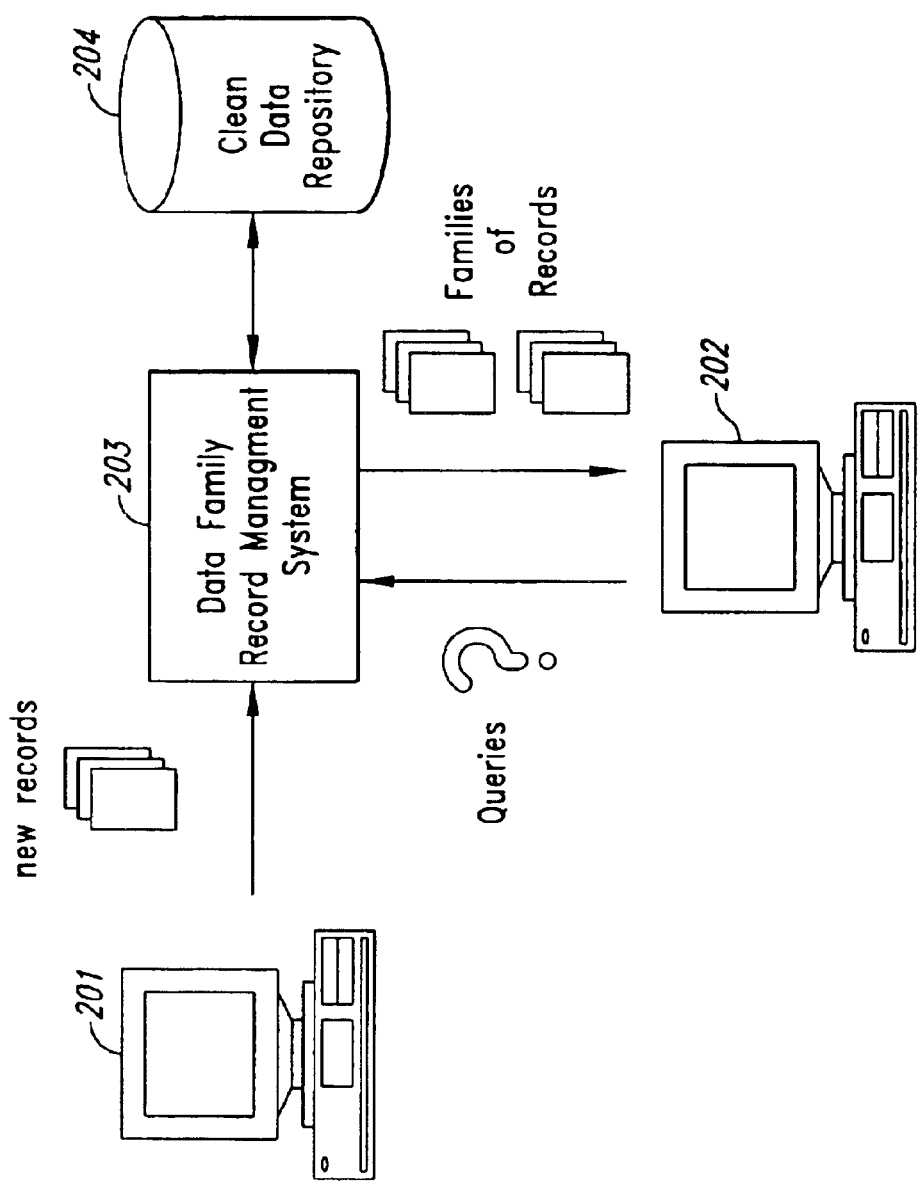
FIG. 2 is an overview block diagram of an example Data Family Record Management System environment.

FIG. 2 is an overview block diagram of an example Data Family Record Management System environment. The Data Family Record Management System (DFRMS) is used to both setup and maintain a data repository of information and to respond to queries regarding the stored information, using the family associations. In FIG. 2, new data records are typically imported using a computer system 201. These data records are then processed by the DFRMS to automatically normalize, de-duplicate and/or consolidate them and to associate them with families when applicable. The new data records are then stored in a "clean" data repository 204, free of duplicate information whenever possible. At some other time, a query can be entered to the DFRMS, for example from a computer system 202, to retrieve data records that are related through families for various applications as described above, and other applications.

One skilled in the art will recognize that the terms "duplicate" or "duplicate record" refer to a configurable definition of what is considered duplicate. As with most data management systems, a duplicate is not necessarily an identical record (field for field) match. Rather, whether a record is a duplicate is based upon what fields are being used in the comparison and whether those fields need to completely match (as in string identity); partially match (as in a subset string match); sound alike, look similar, etc. In the DFRMS, the concept of duplication is further enhanced by normalizing the data in the data records according to a configurable set of conventions.

Figure 3:
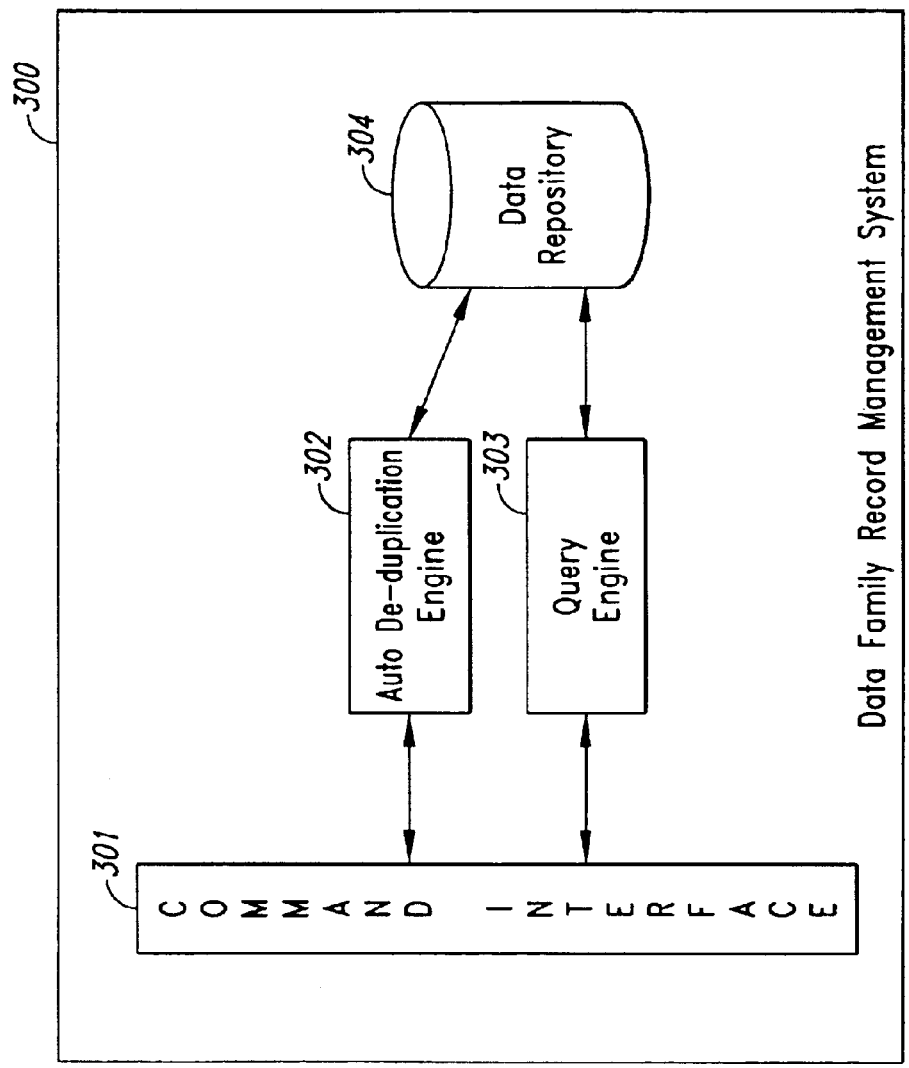
FIG. 3 is an example block diagram of an example embodiment of Data Family Record Management System.

FIG. 3 is an example block diagram of an example embodiment of a Data Family Record Management System. The DFRMS 300 comprises a command interface 301, and auto de-duplication engine 302, a query engine 303, and one or more data repositories 304. The command interface 301 is typically used to configure the fields that are used for family identification and de-duplication (also referred to as de-duping) purposes and for presenting a user interface for queries to the data repositories 304. The auto de-duplication engine 302, as will be described in further detail below with respect to FIGS. 6–23, imports and manages the data records in the data repositories 304. It is responsible for automatically maintaining family relationships among data records when a new data record is entered, automatically de-duping and/or consolidating new records before they are entered in the data repositories 304, automatically merging families when a new record properly joins two sets of related data into a bigger family, and notifying an administrator for manual verification when appropriate. Once the data records are normalized, de-duped, associated with families, and stored in the data repositories 304, the query engine can be used to retrieve data records based upon family relationships.

Figure 4:
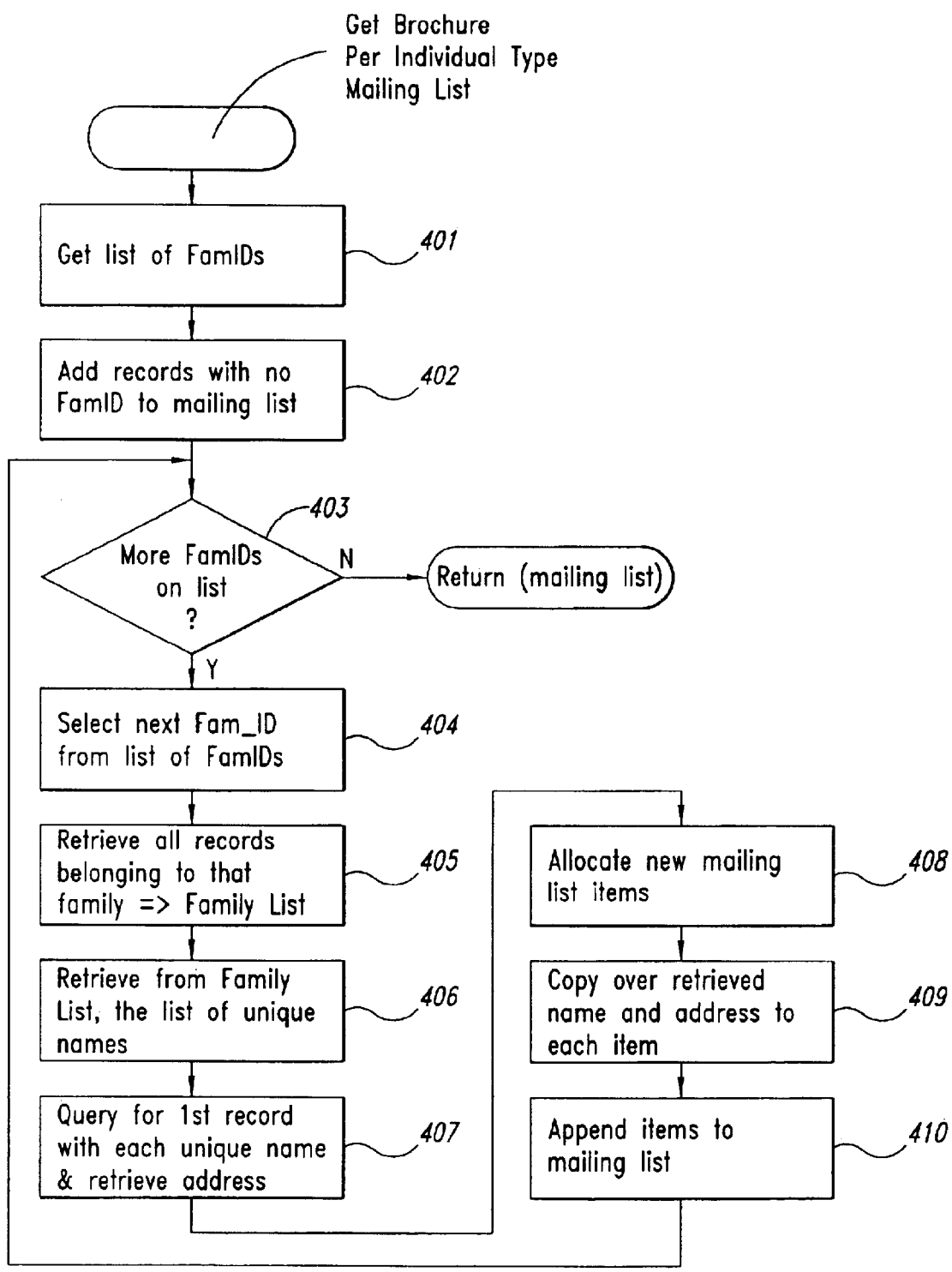
FIG. 4 is an example use of data family records to generate a tailored mailing list.

FIG. 4 is an example use of a family of data records to generate a tailored mailing list. The steps 401–410 would typically be performed by a third party application that desires to use the mailing list for some specific purpose. In this case, the application desires to control the data records retrieved in order to create a mailing list that has a mailing record for each unique name located, regardless of the address. One skilled in the art will recognize, as mentioned previously, that different combinations may be desirable, such as one mailing record per unique location, one mailing record per unique contact per company, one mailing record per unique contact per location, or other such combinations. In step 401, the DFRMS retrieves a list of family identifiers (FamIDs) from the data repository. In step 402, the DFRMS retrieves all single records that meet the requirements of the fields of interest, extracts any desired data, and initializes the mailing list with the extracted data. (Note that, in an alternative embodiment, a family identifier with only one member could be assigned to single records and single records could be processed as with other family identifiers.) In steps 403–410, the DFRMS performs a loop over each family identifier and retrieves information from the members that match designated criteria to populate the mailing list. Specifically, in step 403, the DFRMS determines whether it has any more family identifiers to process and, if so, continues in step 404, otherwise returns the generated mailing list. In step 404, the DFRMS selects the next family identifier on the list as the current family identifier. In step 405, the DFRMS retrieves an indicator to each member data records in the family indicated by the current family identifier and stores the indicators in a family list of members. In step 406, the DFRMS retrieves from the data records indicated by the family list, a list of unique names. Then, in step 407, the DFRMS uses the list of unique names to retrieve a record (e.g., a first record) for each unique name and an address from that record. The DFRMS then allocates new mailing list items as needed in step 408; populates them with the retrieved data, in step 409; appends the newly populated items to the accumulating mailing list in step 410; and returns to the beginning of the loop in step 403.

Figure 5:
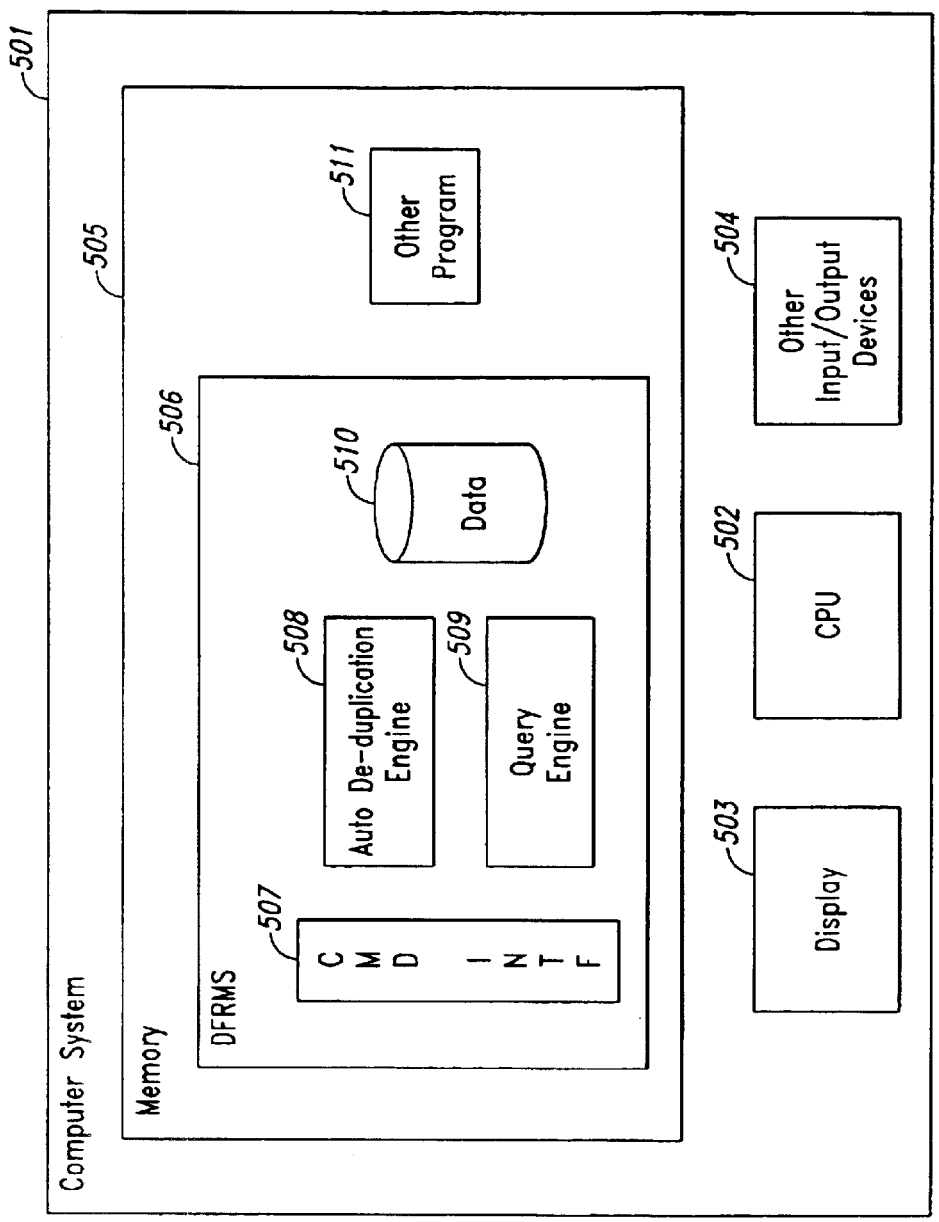
FIG. 5 is a block diagram of a general-purpose computer system for practicing embodiments of the Data Family Record Management System.

FIG. 5 is a block diagram of a general-purpose computer system for practicing embodiments of the Data Family Record Management System. The computer system 501 contains a central processing unit (CPU) 502, a display 503, a computer memory (memory) 505, or other computer-readable memory medium, and other input/output devices 504. The components of the DFRMS 506 typically reside in the memory 505 and execute on the CPU 502. As described in FIG. 3, the DFRMS 506 comprises various components, including a command interface 507, auto de-duplication engine 508, query engine 509, and one or more data repositories 510. These components are shown residing in the memory 505. Other programs 511 also reside in the memory 505.

One skilled in the art will recognize that exemplary data family record management systems can be implemented as one or more code modules and may be implemented in a distributed environment that is comprised of multiple, even heterogeneous, computer systems and networks. In such environments, the various programs shown as currently residing in the memory 505 may be instead distributed among several computer systems, and communicate across a network, such as a wired network like the Internet, or over a wireless network. For example, the data repository 510, which contains the customer records enhanced with family relationship information may reside on a different computer system than the computer system on which the auto de-duplication engine 505 and the query engine 509 reside. In addition, the enhanced customer records may be stored on a remote computer system and may be accessible by authorized third parties, through their own query engines. Further, any well-known mechanism for implementing a data repository may be used to implement the data repository 510, including well-known database techniques.

As described with respect to FIG. 3, the DFRMS includes an auto de-duplication engine 508, which manages the data records in the data repositories 510. The auto de-duplication engine 508 is responsible for automatically maintaining family relationships among data records, automatically de-duping and/or consolidating new records before they are entered in the data repositories 510, automatically merging families when a new record properly joins two sets of related data into a bigger family, and notifying an administrator for manual verification when appropriate. The auto de-duplication engine 510 is invoked to set up and/or maintain the data records whenever a new data record is to be added. Typically, records are added in bulk, such as during an "import" process, or one at a time, either manually, or indirectly from, for example, other code.

FIGS. 6–24 describe an example embodiment of example routines within the DFRMS for achieving these capabilities. In example embodiments, the components of the DFRMS may execute concurrently and asynchronously; thus, the components may communicate using well-known message passing techniques. One skilled in the art will recognize that equivalent synchronous embodiments are also supportable by a DFRMS implementation. Also, one skilled in the art will recognize that other steps could be implemented for each routine described below, and in different orders, and in different routines, yet still equivalently achieve the functions of the DFRMS.

Figure 6:
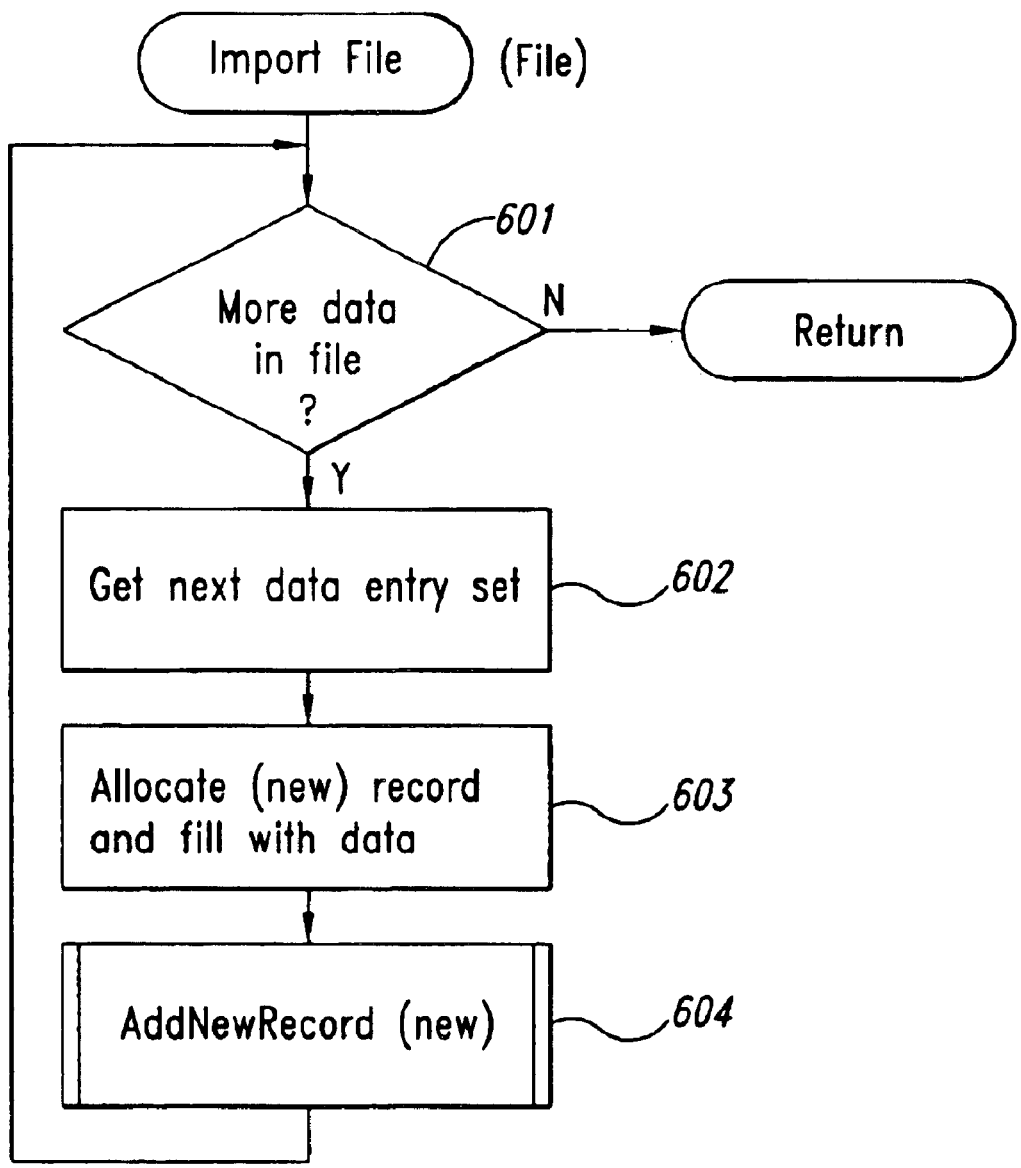
FIG. 6 is an example flow diagram of a routine for importing and automatically de-duplicating a file of new data records.

FIG. 6 is an example flow diagram of a routine for importing and automatically de-duplicating a file of new data records. In summary, the routine loops through each record and calls another routine to add the record. One skilled in the art will recognize that certain efficiencies can be realized by instead processing a group of records to be imported at once, or by doing certain steps later or earlier in the process. It is intended that all such variations in form, format, etc. are equivalent embodiments of the techniques described herein. Specifically, in step 601, the ImportFile routine determines whether there is more data to process in the designated file, and, if so, continues in step 602 to get the next (current) entry, otherwise returns. In step 603, the ImportFile routine allocates a new data record and populates it with data from the current entry. In step 604, the routine invokes the AddNewRecord routine with the new data record as the designated record.

Figure 7A:
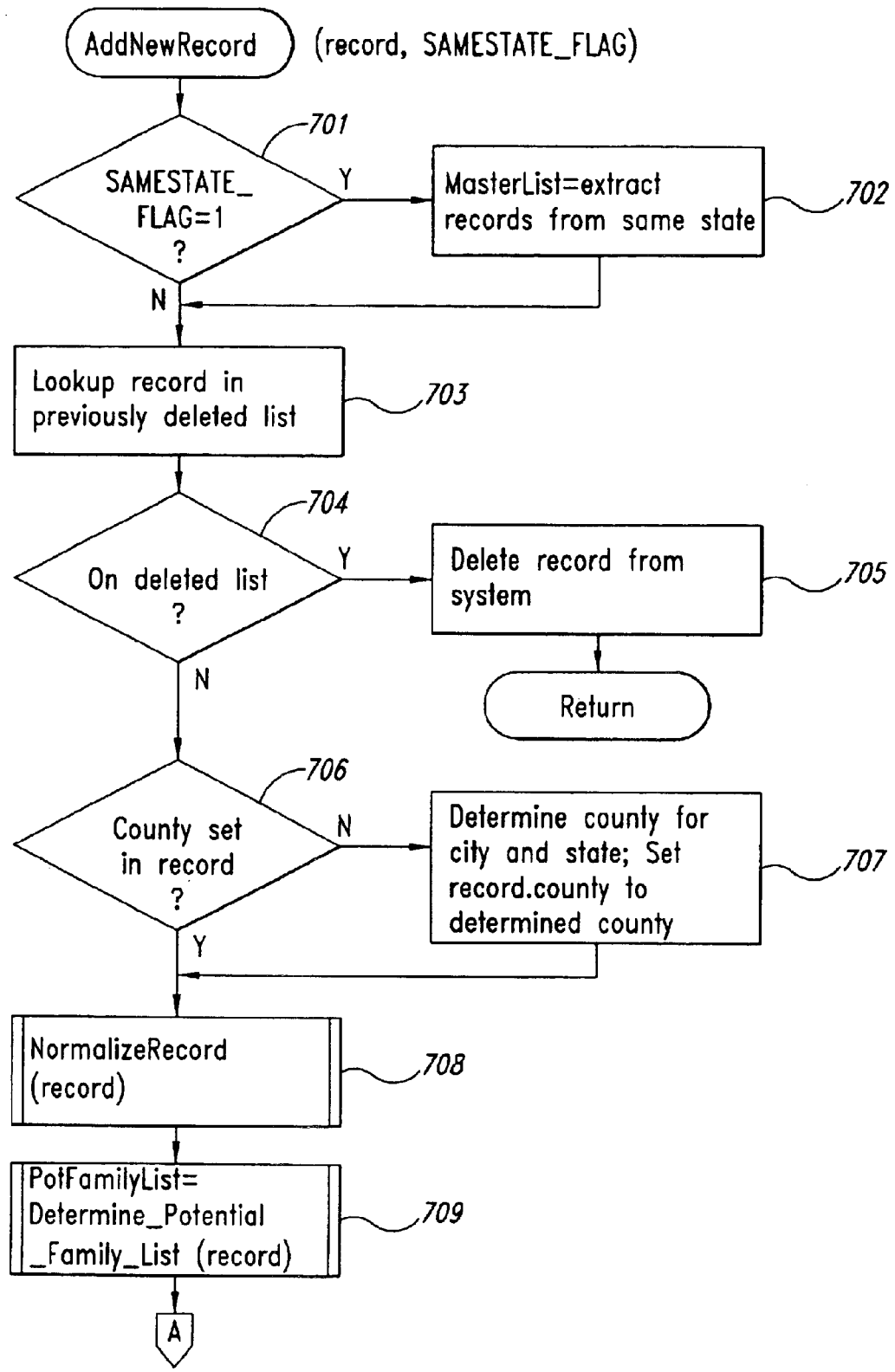
FIGS. 7A and 7B are an example flow diagram of a routine for adding a new record to the record management system.
Figure 7B:
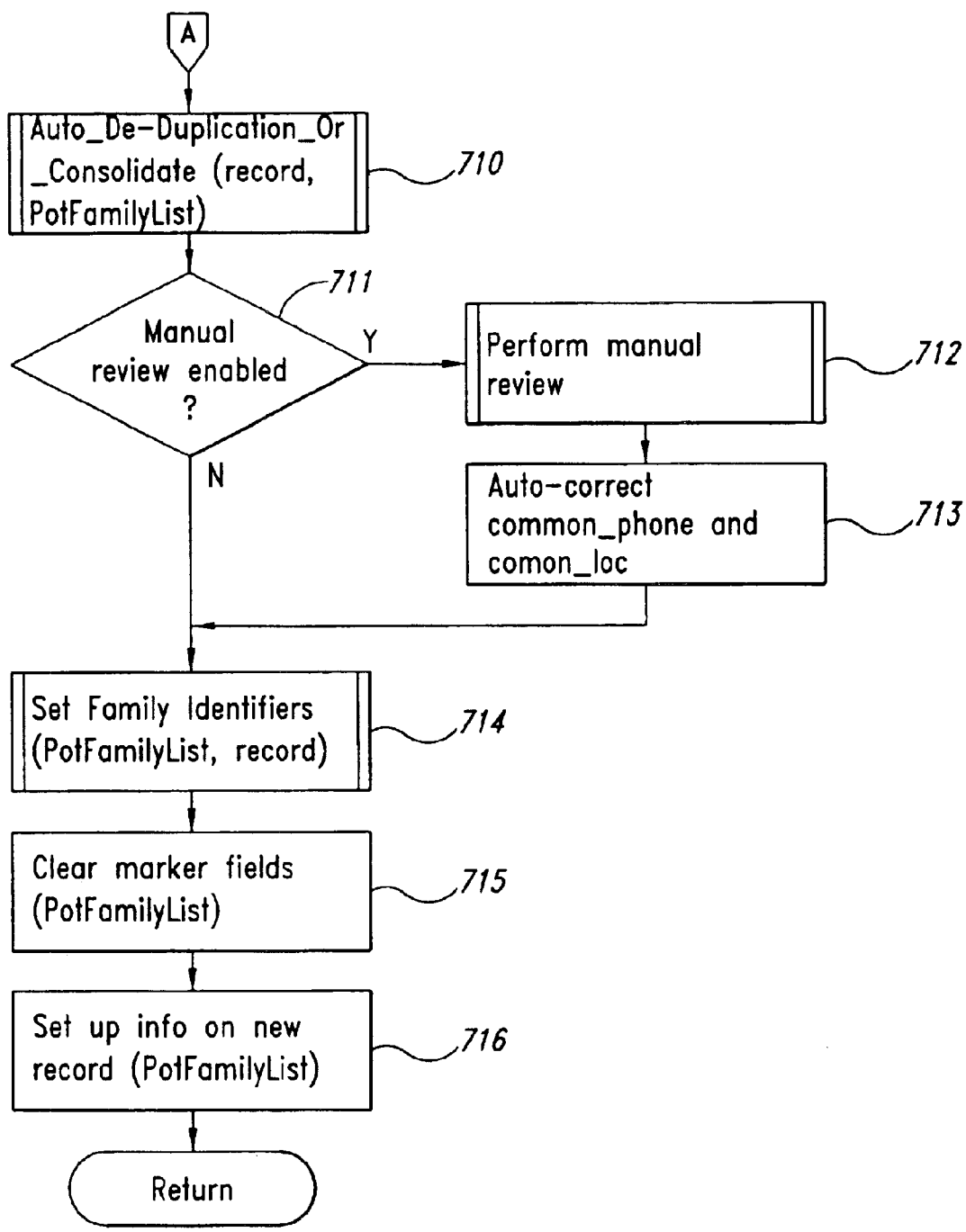

FIGS. 7A and 7B are an example flow diagram of a routine for adding a new record to the record management system. The AddNewRecord routine has a designated record as input, and one or more parameters as configured by an administrator of the system to restrict and or select a "record space" for performing automatic de-duplication. In the case illustrated, the administrator has chosen to restrict the space to records from the same state; hence, a SAMESTATE_FLAG is passed (and set) as an input parameter. Note again that this example routine is structured for a data set containing contact/address type information. One skilled in the art will recognize how to customize the routine for other specific data sets or how to generalize it to become table (data) driven using standard programming techniques. In overview, the AddNewRecord routine makes sure the designated record hasn't been seen and deleted previously; normalizes the record, including filling in additional information when possible (e.g., county information); determines all related (directly and indirectly) potential family members by searching the data repository; performs automatic de-duplication/consolidation, sets/updates family identifiers based upon adding the new member; and adds the new member.

More specifically, in step 701, if the SAMESTATE_FLAG is set, then the AddNewRecord routine, in step 702, extracts from the data repository data records that share the same value in the State field as the designated record and stores indicators to them in a Master List. If the flag is not set, the routine continues.

In step 703, the routine determines whether the designated record is on a list of previously deleted records. This scenario could occur, for example, when two different sources of data records contain the same data record and that record has been previously processed. There are several methods for implementing the tracking of deleted records. One such method keeps a data repository of deleted records and normalizes the fields of the designated record that will be compared before performing the comparison to insure greater integrity in any match, and compares the designated record to the data repository of deleted records. In step 704, if the AddNewRecord routine determines that the designated record is on the deleted list, then in step 705, the designated record is deleted from the system and the AddNewRecord routine returns, else the routine continues in step 706.

In step 706, the routine checks the designated record to see if a "county" field is filled in (or other information being filled in), and if not, continues in step 707 to determine the correct county for that record, otherwise, continues in step 708. One way to determine the correct county is to use the city & state, and area code or zip code to perform a lookup into standardized publicly accessible electronic zip code tables. Note that, for configurations that contain completely different types of data records, the county field may be moot or not exist. In step 708, the routine calls the NormnalizeRecord routine on the designated record to transform the data in designated fields into a standard form or according to configurable conventions. The fields potentially normalized depend upon what fields are being used to detect relationships and duplication. This routine is discussed further below with respect to FIG. 8.

In step 709, the AddNewRecord routine invokes a Determine_Potential_Family_List routine to search the Master List for all related data records, both related directly and/or indirectly though potentially many levels of embedding. This routine is discussed further below with respect to FIG. 9. In step 710, the AddNewRecord routine invokes a Auto_De-Duplication_Or_Consolidation routine to determine whether any new record needs to be deleted and/or merged. This routine is discussed further below with respect to FIG. 20.

In steps 711–713, the AddNewRecord routine (optionally) enables manual review of the data records after the automated family identification and de-duplication/consolidation process. If in step 711, manual review has been enabled, then an interface (through a command interface such as command interface 301 in FIG. 3) is invoked in step 712 to assist in the manual review process. In step 713, the fields that are used to identify records as related records (e.g, common_addr, common_phone) are checked to make sure they are still set and internally consistent, since a user could have inadvertently removed data field values. One skilled in the art will recognize that these types of steps can be eliminated by appropriate restriction of the editing capabilities of data records during manual review.

In step 714, the AddNewRecord routine invokes the SetFamilyIdentifiers routine to associate family identifiers with the data records identified in the potential family list as appropriate and for the new record. This routine is discussed further below with respect to FIG. 22. In step 715, the AddNewRecord routine clears any markers used for detecting relationships from the members of the potential family list. In step 716, the routine completes any set up of information on the designated record based upon the associated family identifiers, and returns.

Figure 8:
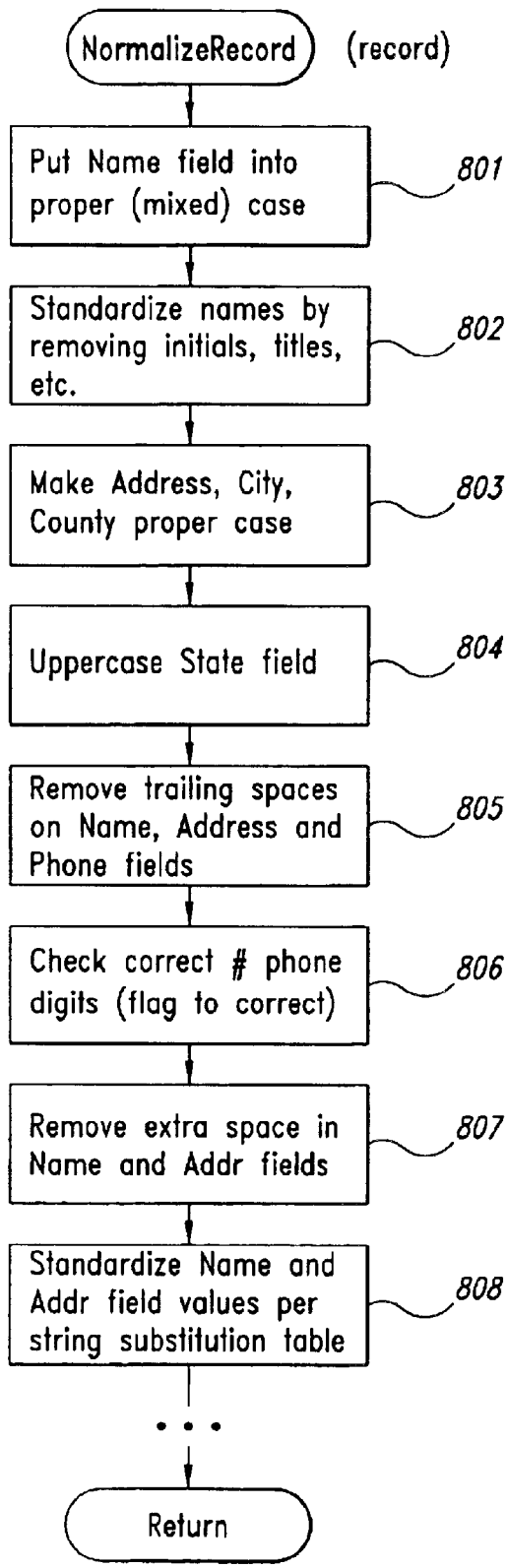
FIG. 8 is an example flow diagram of a routine for normalizing a data record according to a set of conventions.

FIG. 8 is an example flow diagram of a routine for normalizing a data record according to a set of conventions. The NormalizeRecord routine transforms the data in designated fields of the designated record into a standard form or according to configurable conventions. The fields potentially normalized depend upon what fields are being used to detect relationships and duplication and the eventual use of the data, for example, the fields used to construct a mailing list. The purpose of the transformations is to normalize the data so that comparisons that one would expect to generate matches do. For example, "Mr. Tom Johnson" at the same address and phone number typically should trigger a match to Tom Johnson when used in contact-related applications. Similarly, "Ace Hardware, Inc." at the same location as an "Ace Hardware" typically should trigger a match. Sample fields, conventions, and standardization are reflected in the steps of this routine; however, one skilled in the art will recognize that any such tests and transforms could be performed, and that they are preferably configurable such as through a lookup table. Appendix A, which is herein incorporated by reference in its entirety, contains a list of such conventions to be used with a data repository having data records for contacting companies. In step 801, the value in the Name field is transformed into proper (mixed) case. In step 802, the value in the Name field (or similar fields such as contacts) is standardized to remove titles, initials, extra spaces, etc. In step 803, the values in the Address, City, and County fields are converted to proper case. In step 804, the value in the State field is uppercased. In step 805, trailing spaces are removed from the values in various fields. In step 806, the value in the Phone field is checked for the correct number of digits and, if not, flagged for follow up (since the purpose of this database is for contacting companies). In step 807, internal extra space is removed from various fields, here the Name and Address fields. In step 808, the Name and Address fields are standardized using, for example, a string substitution table. For example, the value "N.e." is replaced with "NE." Other steps, and different steps are contemplated. The NormalizeRecord routine then returns.

Figure 9:
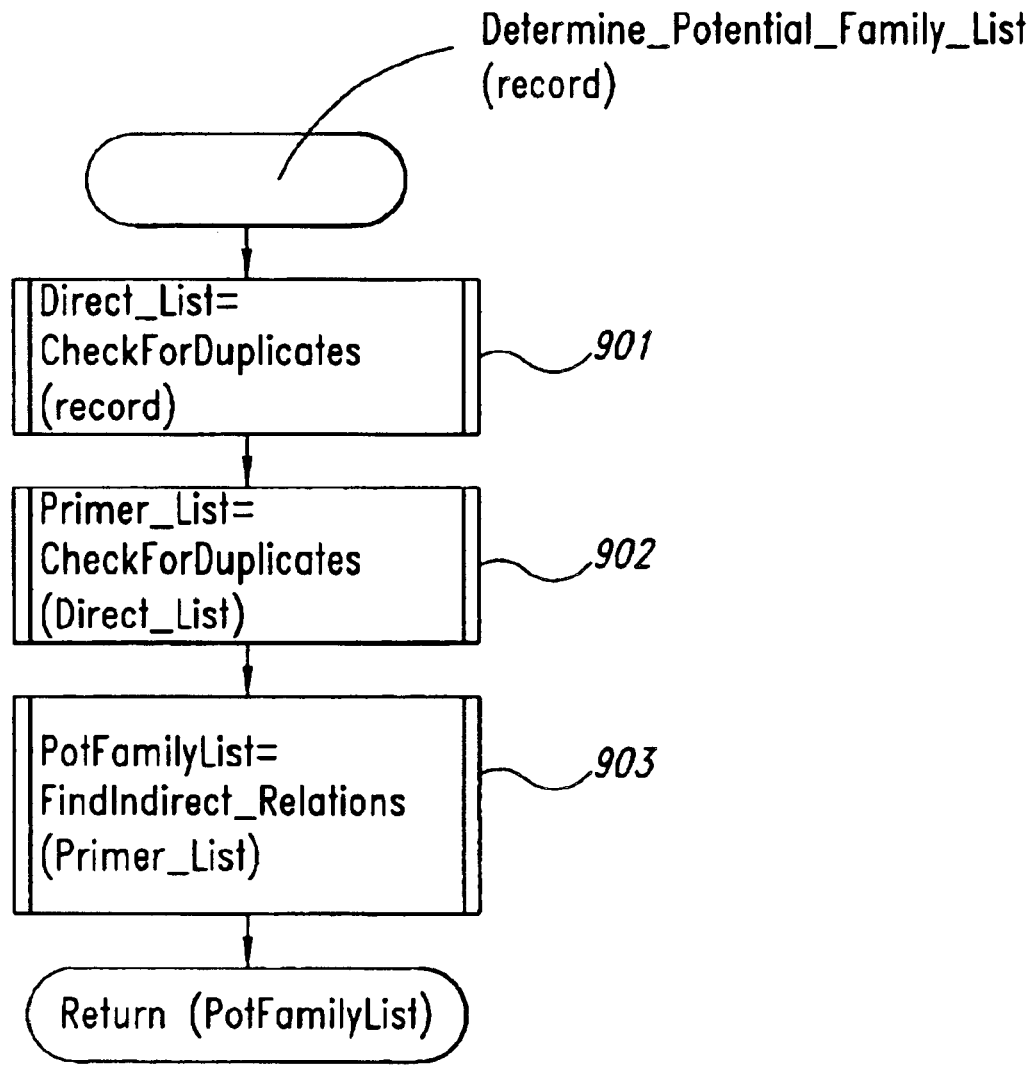
FIG. 9 is an example flow diagram of an overall routine for determining a potential family list.

FIG. 9 is an example flow diagram of an overall routine for determining a potential family list. It searches for all data records in the (possibly same state-based) Master List that are related either directly or indirectly, hence it performs an exhaustive search starting with the designated record. In one embodiment, as is shown herein, the search for related data records is broken up into parts, where each part may potentially look for relationships using different fields. An alternative is to not break up the search and instead search on a single set of fields. In the case demonstrated here, in step 901, a direct relationship search is first done on the designated record by invoking a CheckForDuplicates routine, discussed further below with respect to FIG. 10. Then, in step 902, a second direct relationship search is done on the records that matched the first search matched, to generate a first level of indirection list based upon matching a combination of a (core) name and state, or an address, or a phone number. The core of a name is the base of the name without organizational titles, such as Inc., Corp., Co., etc. The generated list, referred to in step 902 as the Primer_List is then used in step 903 to find indirect relationships, based upon only a match with either an address or phone number, by invoking a FindIndirectRelations routine, discussed further with respect to FIG. 13. The technique demonstrated (searching in parts) thus ends up giving a greater weighting to matches on the combination of a (core) name and state. Again, this is only one such technique for searching for these relationships. One skilled in the art will recognize that a multitude of combinations can be used, depending upon what fields are used for comparison and at what point in the process.

Figure 10:
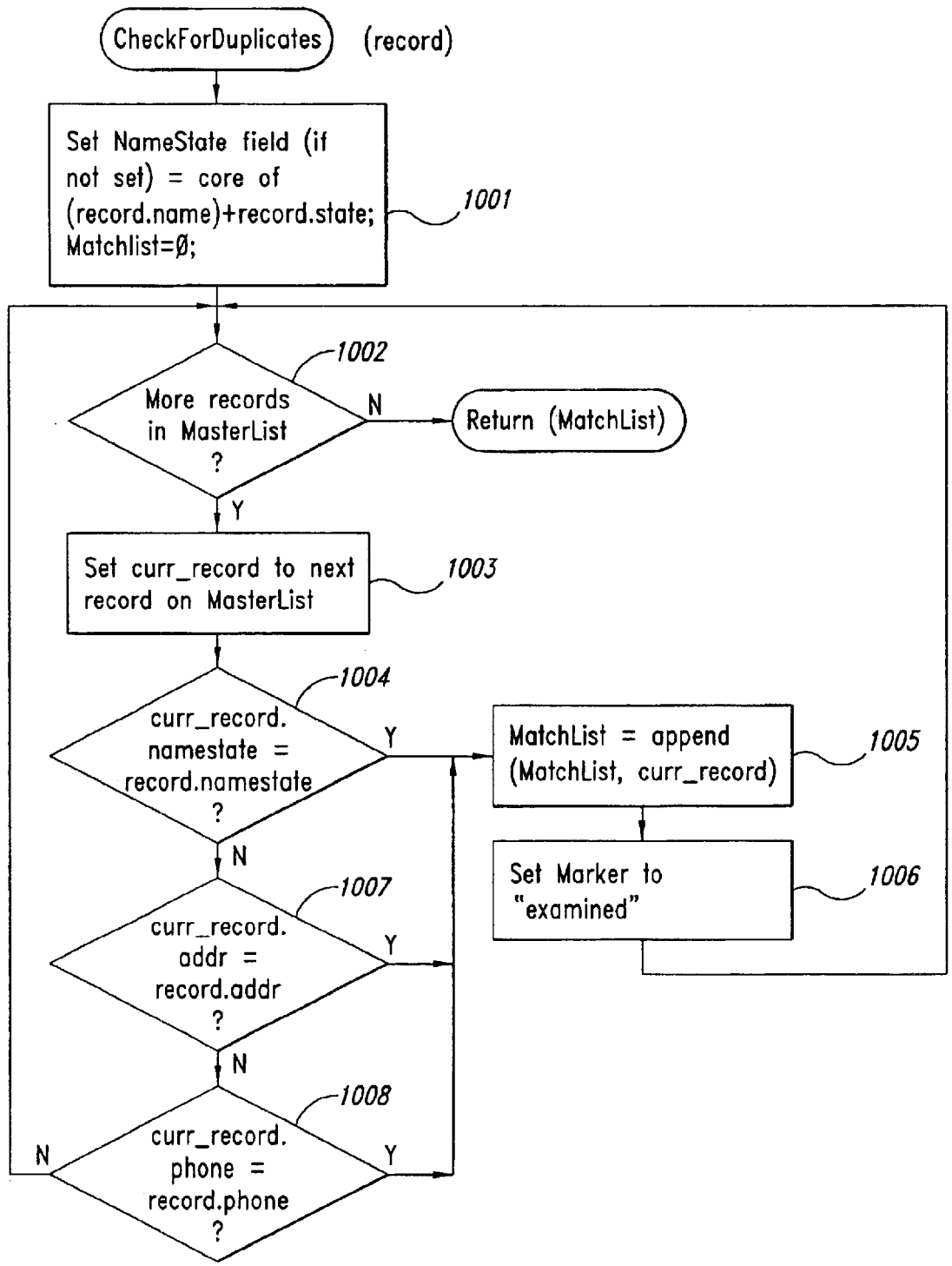
FIG. 10 is an example flow diagram of a routine for checking for direct duplicate records.

FIG. 10 is an example flow diagram of a routine for checking for direct duplicate records. The CheckForDuplicates routine demonstrated here determines direct relationships based upon matches to a NameState value, an Address value, or a Phone value. One skilled in the art will recognize that different or additional field values may be used. In step 1001, the routine sets up the NameState field of the designated record, if it is not already set. The NameState field represents a concatenated string of the core of the Name field value (a business name in this case, but could be a contact) plus the value in the State field. Steps 1002–1008 perform a loop to determine data records directly related to the designated record. Specifically, in step 1002, the routine determines whether there remain more records in the Master List, and if not, returns the accumulating matching list (MatchList), otherwise continues in step 1003. In step 1003, the routine sets the current record to the next record on the Master List. In step 1004, the routine compares the NameState field of the designated record with the current record, and if a match occurs, continues in step 1005, else continues in step 1007. In step 1005, the matching list is appended with an indication of the current (matching) record, and a marker is set in the current record in step 1006 to indicate that this record has been examined and matches something. The routine then returns to the beginning of the loop in step 1002 to examine the next record. In step 1007, the routine compares the Address field of the designated record with the current record, and if a match occurs, continues in step 1005, else continues in step 1008. In step 1008, the routine compares the Phone field of the designated record with the current record, and if a match occurs, continues in step 1005, else continues to the beginning of the loop in step 1002 to search the next record (because no direct relationship between the current record and the designated record was found).

FIG. 11 shows sample data and a table of example results after executing a routine for checking for direct duplicate records on the sample data. Table 1 contains sample data with eight existing records and one new record (the designated record) as record 9. As can be seen in the results shown in Table 2, the designated record 9 is directly related to record 4 through its NameState field, to records 7 and 8 through its Address field, and to record 1 through its Phone field. Thus, the list of the direct relationships found (MatchList) contains indicators to data records 1, 4, 7, and 8.

FIG. 12 shows a table of example results after executing the routine for checking for direct duplicate records on the results from a prior invocation of the routine. Specifically, the CheckForDuplicates routine is shown after processing the list illustrated in Table 2 in FIG. 11. In the example illustrated in Table 3, two additional data records are located, records 2 and 3, which are both directly related to record 1 through its NameState field. Therefore, record 9, the new record, is indirectly related (by one level of indirection) to records 2, 3 through record 1. The detail of intermediate results during execution is included in comments to Table 3.

Figure 13:
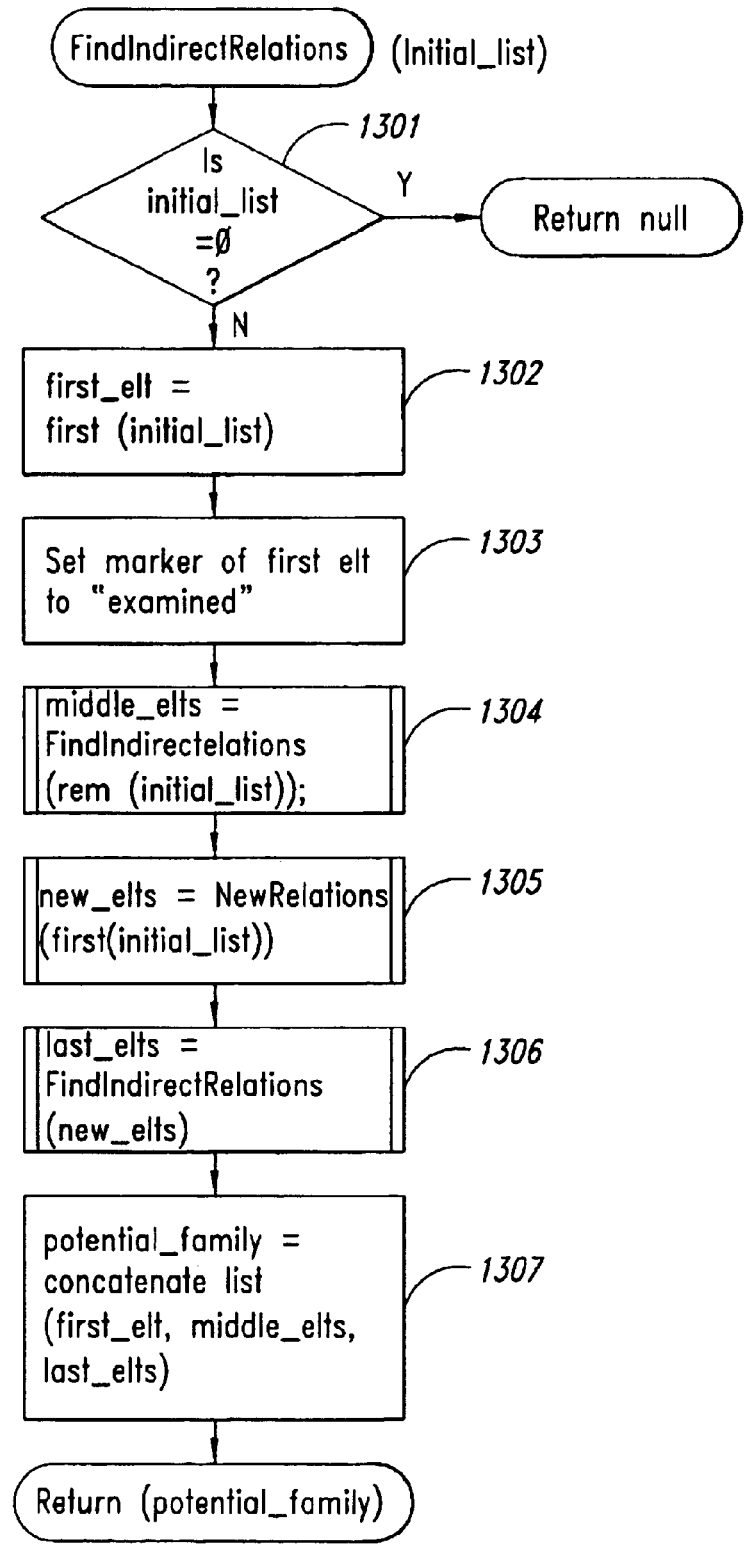
FIG. 13 is an example flow diagram of a recursive routine for finding indirectly related data records.

FIG. 13 is an example flow diagram of a recursive routine for finding indirectly related data records. The FindIndirectRelations routine is the "powerhouse" routine for generating related records. It exhaustively searches the Master List on every record it finds, until no more embedded relationships can be determined. Included below, for ease of discussion, is Table A, a table of pseudo-code, which summarizes the recursion for building up the potential family list. One skilled in the art will recognize that equivalent iterative (looping) routines can be used to generate the same list, although not necessarily in the same order, by adding any new records found to be related to the designated record to the end of an accumulating list of designated records being matched, to insure that they, too, are matched.

TABLE A

| *new_list | NewRelations(list item) { ...finds all new records that are related through ...phone number or address } |
|---|---|
| *return_list | FindIndirectRelations (initial_list) { if initial_list == nil, then return nil; return_list = concatenate (first (initial_list), FindIndirectRelations (rem (initial_list)), FindIndirectRelations (NewRelations (first (initial_list))) } |

In Table A and in FIG. 13, the routine operates by building up a list from (1) the first record (element) in the current list "first (initial_list)"; (2) the results from searching for matches based on the remainder of the current list "rem (initial_list)" for any related records; and (3) the results from searching for matches based on a list of newly found related records that relate to the first record "NewRelations (first (initial_list)))". (Indicators to records, not records are preferably stored on the lists.) Due to the nature of recursive technique, the internal calls to search for related records do not return until they reach a record for which there are no related records, thus insuring that all of the records have been exhaustively examined. Thus given an initial list [1, 7, 8, 4, 9, 2, 3] from the result of directly related records searching (see FIG. 10), and supposing that record 1 is directly related to records 9, 2, and 3 (see Table 3 in FIG. 12), then the first invocation of FindIndirectRelations would set return_list=concatenation of ([1], FindIndirectRelations ([7, 8, 4, 9, 2, 3]), FindIndirectRelations (nil)). The invocations of FindIndirectRelations will continue similarly until no new related records are found.

In FIG. 13, this logic is represented in steps 1301–1307. In step 1301, the routine determines whether the designated list ("initial_list") is nil, and, if so returns a nil (null) list, otherwise continues in step 1302. In step 1302, an indicator to the first record (the first element) on the designated list is saved for building up the accumulating list of potential family members (records that are related). In step 1303, the routine sets a marker on the first record to indicate that it has been examined and is part of the potential family. In step 1304, the routine calls itself with the remainder of the designated list (the list minus the indicator to the first record) and saves the result for building up the accumulating list of potential family members. In step 1305, the routine determines, by invoking a NewRelations routine, whether there are any records not already part of the potential family, that are directly related (in this example, through a common phone number or common address) to the first record. The NewRelations routine is described further with reference to FIG. 14. Then, in step 1306, the routine searches for any further related records using the list determined by the NewRelations routine and saves the result for building up the accumulating list of potential family members. This last step insures that as new records are found to be potential members of the family, they are also used to search for indirectly related records. In step 1307, the accumulating list of potential family members is built by concatenating the saved results from steps 1302, 1304, and 1306, and this list is returned.

Figure 14:
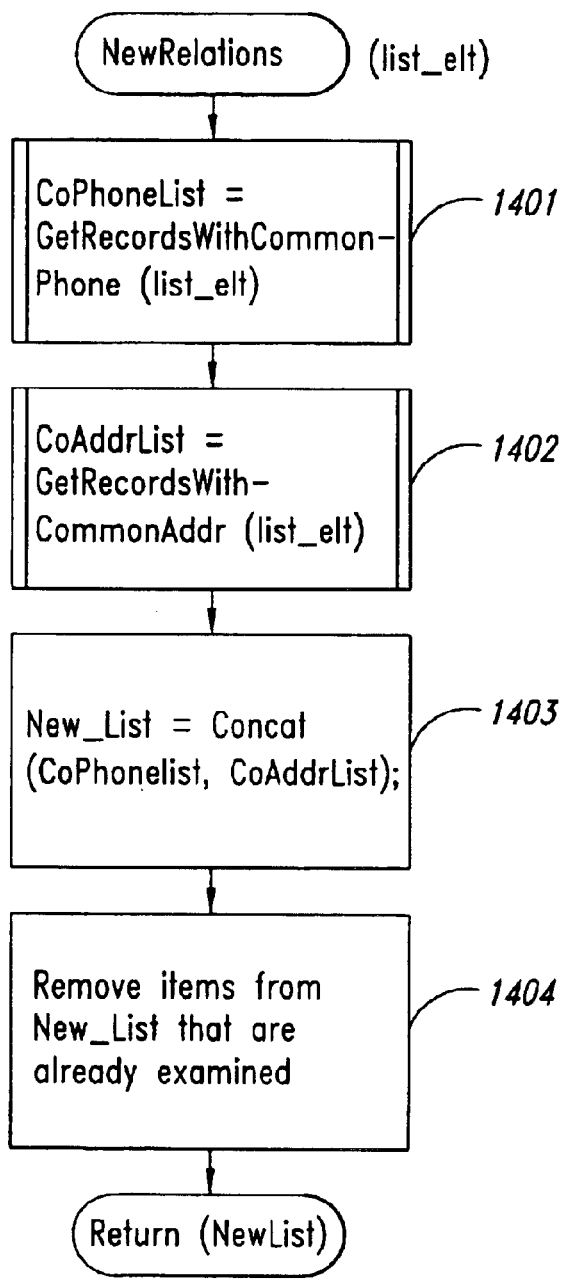
FIG. 14 is an example flow diagram of a routine for finding related records to a given data record.

FIG. 14 is an example flow diagram of a routine for finding related records to a given data record. Given a designated record (from a list element), the NewRelations routine searches based upon configurable fields for other records that share the same values for those fields. In the illustrated example, records are determined to match if they share a phone number in common and/or if they share an address in common. Records that have already been examined and are part of the potential family being built up are ignored. Specifically, in step 1401, a routine for retrieving records having a common phone number is invoked and the results saved in a list of records having a common phone number. In step 1402, a routine for retrieving records having a common address is invoked and the results saved in a list of records having a common address. In step 1403, the two saved lists are accumulated and in 1404, the records on the list are examined to make sure they aren't duplicates on the potential family list. Among other techniques, this examination can be performed by retrieving and eliminating records whose "markers" have been previously set. The accumulated list is then returned back to the FindIndirectRelations routine to be further searched as previously described.

Figure 15:
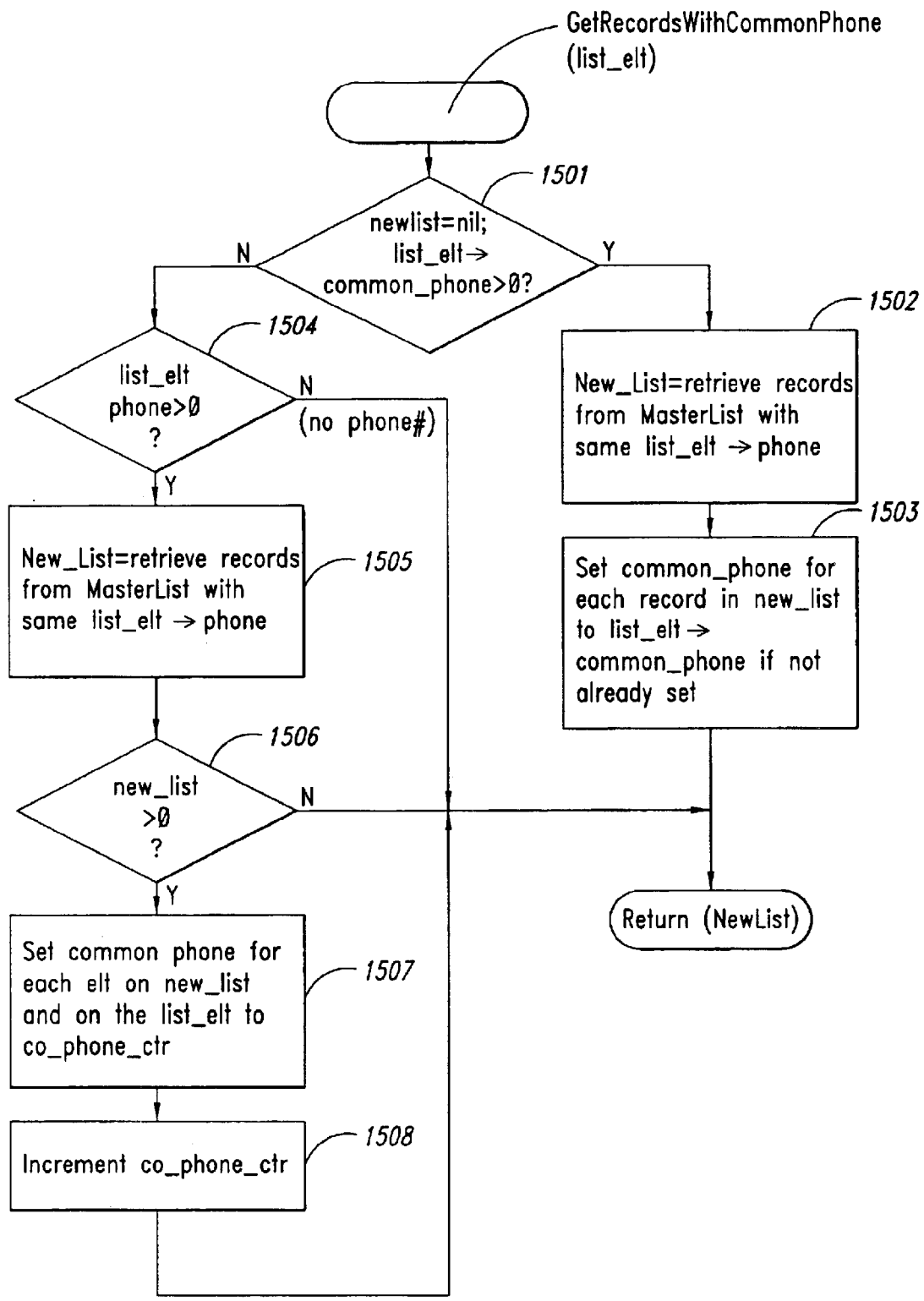
FIG. 15 is an example flow diagram of a routine for retrieving records having a common phone number with a designated record.

FIG. 15 is an example flow diagram of a routine for retrieving records having a common phone number with a designated record. The GetRecordsWithCommonPhone routine has one input parameter, a designated list element, which indicates a record. A list of matching records is returned. In step 1501, the returning list is initialized and a common_phone indicator (field) of the designated record is checked to see if it is set, and, if so, the routine continues in step 1502, else continues in step 1504. In step 1502, since the common_phone indicator has a value, it means that some other record shares a phone number with this record. The Master List is thus searched to retrieve all records with the same phone number as the phone number of the designated record. In step 1503, for each newly found record, the common_phone indicator is set (if it is not already set) to the counter stored in the designated record, and the list of newly found records is returned. In step 1504, the routine checks to see if the designated record has a phone number set, and if not, returns the list of newly found records, otherwise continues in step 1505. In step 1505, the routine searches the Master List to retrieve all records with the same phone number as the phone number of the designated record. In step 1506, if no new records were found, then the list of newly found records (nil at this point) is returned, else the routine continues in step 1507. In step 1507, the routine sets the common_phone indicator for each record on the list of newly found records and the designated record to a new counter value for common_phone, and in step 1508, increments the new counter. The list of newly found records is then returned, and the common_phone indicators have been appropriately set on each element in the list.

Figure 16:
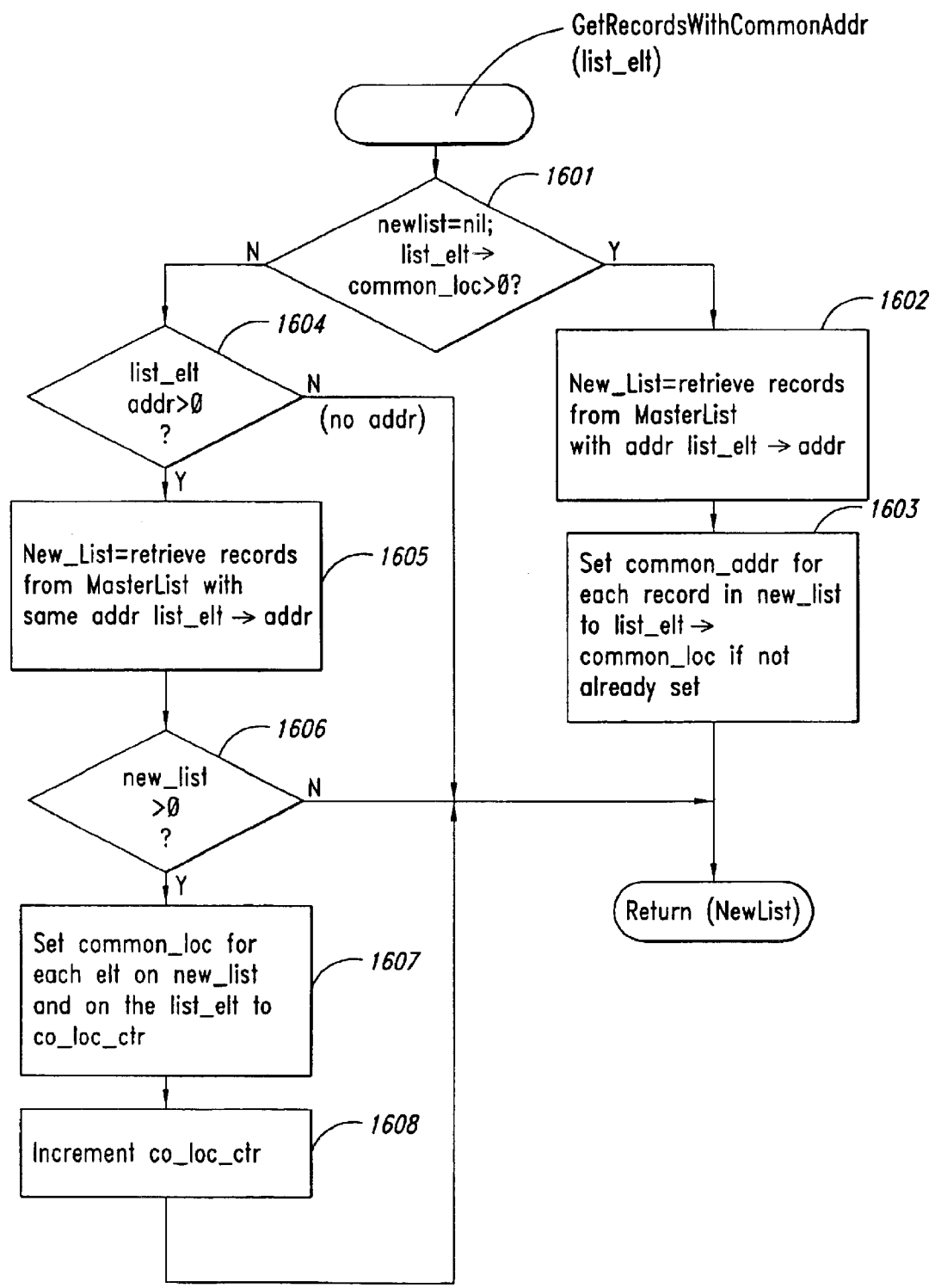
FIG. 16 is an example flow diagram of a routine for retrieving records having a common address with a designated record.

FIG. 16 is an example flow diagram of a routine for retrieving records having a common address with a designated record. The GetRecordsWithCommonAddress routine operates similarly to FIG. 15 except that it sets a common_address field instead of the common_phone field when it finds matching records.

One skilled in the art will recognize that, although FIGS. 10 and 13–16 are tailored to a specific data record type (with contact information), these routines are easily and equivalently modified to accommodate searches based upon other fields of data. In addition, the routines (and corresponding flow diagrams) can be generalized to retrieve what fields are to be searched from a configurable table. Also, parameters could be passed to the routines indicating the fields to be used. Many such implementations are possible and contemplated to be used with the techniques described here.

FIGS. 17 and 18 show tables of example results after executing a routine for finding indirectly related data records. Tables 4 and 5 are generated by calling an iterative (looping) version of the FindIndirectRelations routine discussed with reference to FIG. 13 using the data records from Table 3 in FIG. 12 as the initial_list. As can be seen in Table 5, after performing the exhaustive search based upon common phone and/or common address, one new record, record 5, is found. As the records are found, the common_phone and common_address indicators are set as needed to indicate which records share a common phone number or share a common address.

As an alternative to the DeterminePotentialFamilyList routine discussed with reference to FIG. 9, it was mentioned that, instead of "priming" the FindIndirectRelations routine by generating an initial list based upon directly related records to the designated record and indirectly related records one level deep, one could invoke the search for indirectly related records (the embedded search) beginning on the designated record. In doing so, it would be beneficial to include a check for matching the NameState field to insure that matches of the company/person name would also be identified. As another alternative, without changing the routine of FIG. 9 (still "priming" the indirect relationship), one could also extend the meaning of a match during the indirect searching to include the NameState field. FIG. 19 shows a table of example results after executing an alternative routine for finding indirectly related data records to the data records from Table 3 in FIG. 12. A disadvantage of this method is that records that are more remote in "relatedness" may be included in the family. An advantage of this method is the ability to insure that all related records, no matter how remote, are included. Different applications with differing kinds of data records will have varying responses.

Once the data records have been compared to a designated data record, and a potential family identified, an automatic de-duplication/consolidation process is performed to determine whether the designated record should be deleted as a "real" duplicate, consolidated (merged) with another record, or left alone. In general, as much as can be pre-configured into the system based upon tolerances regarding the type of data being processed, the DFRMS is able to auto-delete or auto-consolidate or make recommendations to an administrator of the system as to the disposition of a new data record. The automatic de-duplication/consolidation process is table driven, and the entries in the table reflect configured tolerances. The table entries, in effect, serve as a state diagram for the automatic de-duplication/consolidation. In the described embodiment, if a new data record has matching (core) Name, Address, and Phone field values, then the new data record is automatically deleted (with some cases first involving consolidation of data between records). Similarly, if a new data record has matching (core) Name and Address field values and at least a matching City value, then the new record is also considered to match the same company (probably a different contact) and the record is deleted in this case. Appendix B illustrates one possible configuration for driving the auto de-duplication/consolidation process, and is incorporated by reference herein in its entirety. One skilled in the art will recognize that other types of data and applications that use the data will yield different results based upon different configurations and that many other configurations are possible using a table-driven solution for the process.

Figure 20:
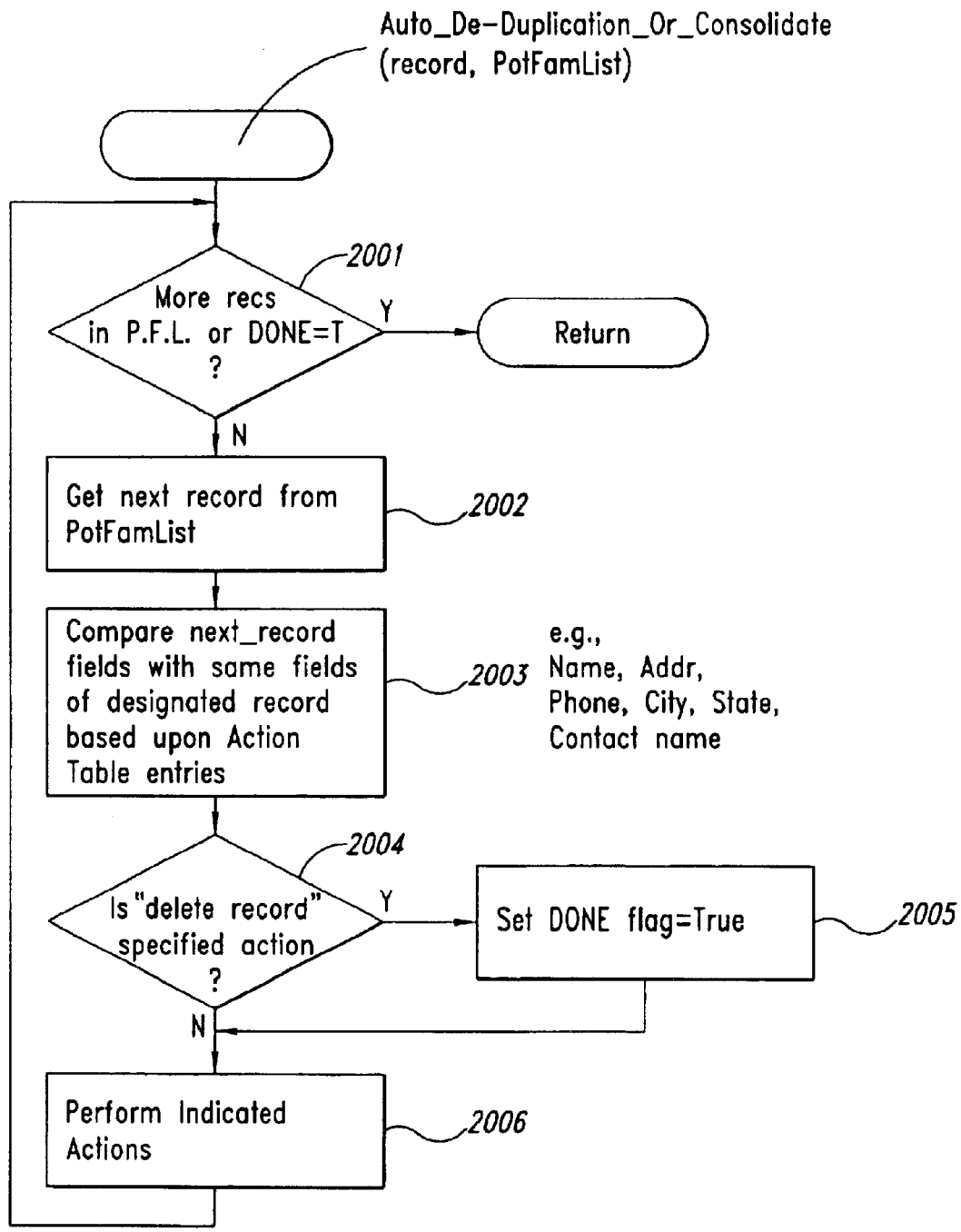
FIG. 20 is an example flow diagram of a routine for performing auto de-duplication and consolidation of data records.

FIG. 20 is an example flow diagram of a routine for performing auto de-duplication and consolidation of data records. The Auto_De-Duplication_Or_Consolidation routine examines a designated new record against each record in the designated potential family list and performs the actions indicated in the table. Possible actions include, for example, deleting the record, consolidating certain fields into an existing record (e.g., another contact name) and deleting the record, filling in the potential family identifier if known, and flagging the new data record for manual follow-up with a recommended disposition. Other actions, of course, are possible. Specifically, in step 2001, the routine determines whether there are any more data records left in the potential family list to compare, or whether the routine has already determined to delete the designated record, and, if so, returns, else continues in step 2002. In step 2002, the next data record indicated by the potential family list is retrieved as the current record. In step 2003, the designated data record is compared (on specific fields as designated in the table) with the current record and a corresponding table entry, based upon the matching fields, is determined. In step 2004, if the comparison determines that "delete" is a specified action to perform, then a "DONE" flag is set to "true" and the routine continues in step 2006, otherwise the routine continues in step 2006. In step 2006, the routine performs the actions indicated in the table entry that corresponds to the matches between the records, and continues back to the beginning of the loop in step 2001.

FIG. 21 shows a table of example results after executing a routine for performing auto de-duplication and consolidation. The resulting entries reflect a configuration table design as exemplified above, in which a matching Name, Address, and Phone fields or a matching Name, Address, and City fields automatically trigger a deletion of a record. In this case, the new data record is record 9, which although has a matching Name to Record 4, doesn't have a matching address, so it is presumed to designate a different company.

Figure 22A:
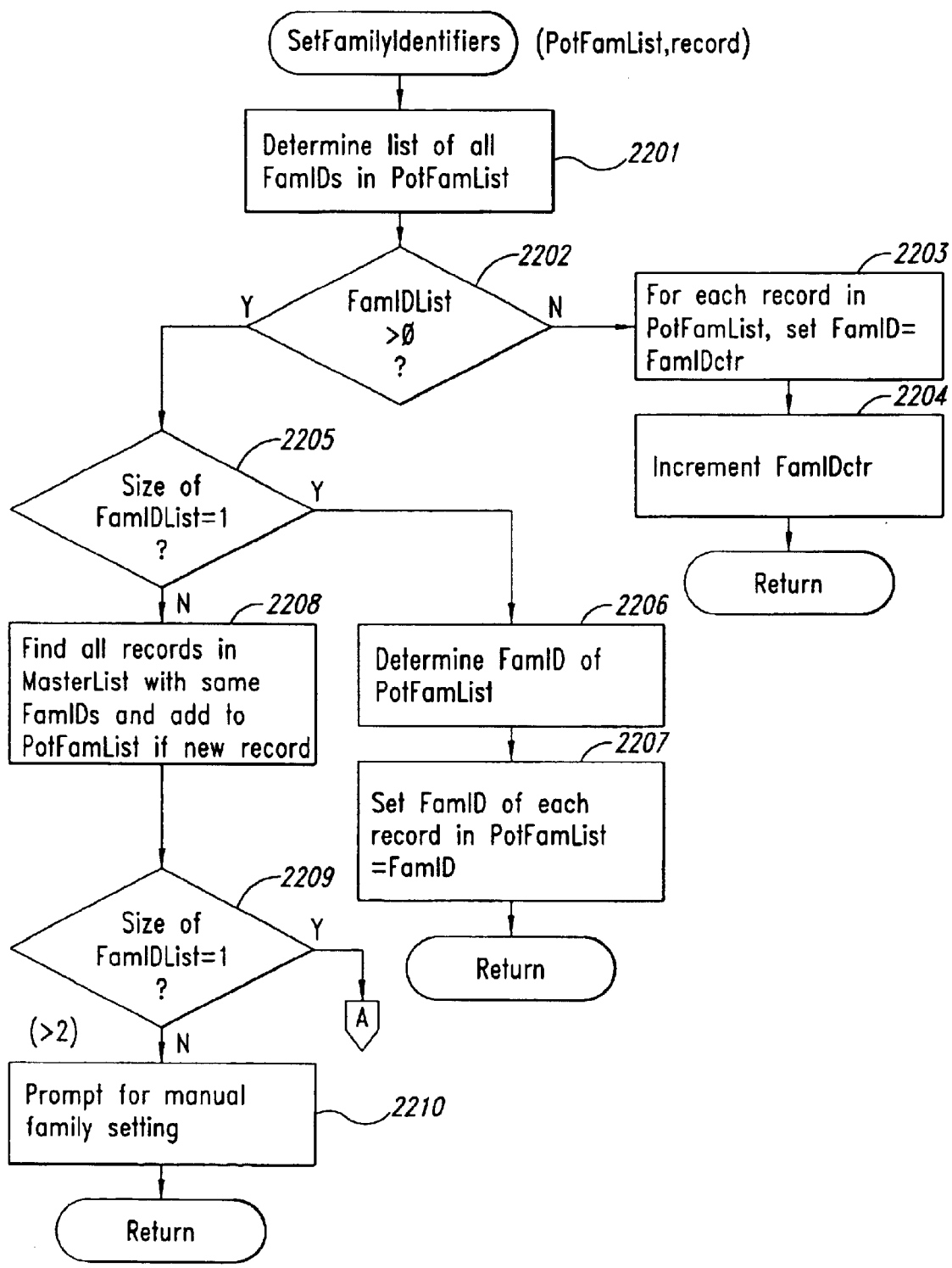
FIGS. 22A and 22B are an example flow diagram of a routine for setting family indicators in a list of data records.
Figure 22B:
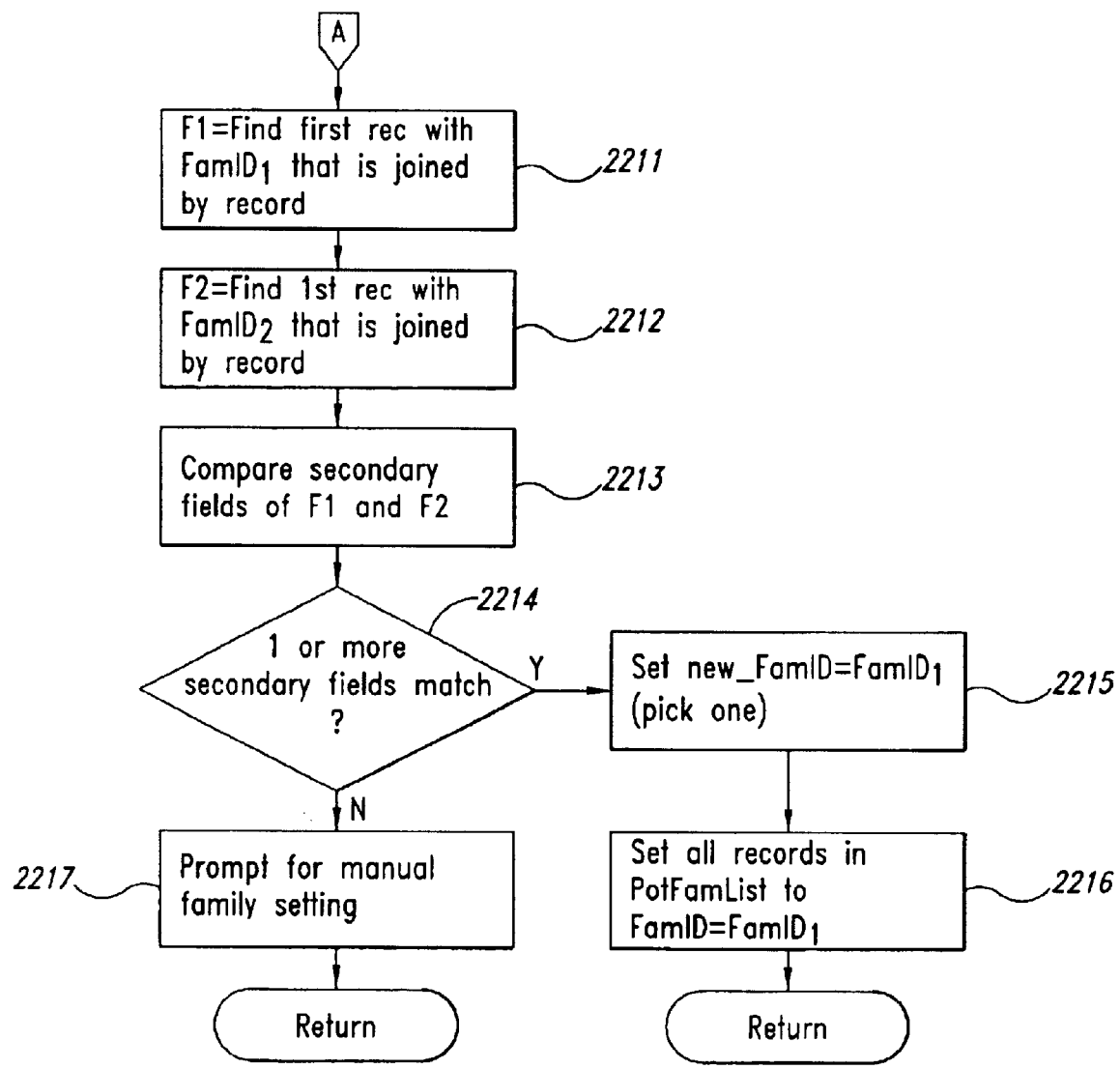

Once the automatic de-duplication and consolidation process is performed, the DFRMS is ready to assign family identifiers to the "clean" family. FIGS. 22A and 22B are an example flow diagram of a routine for setting family indicators in a list of data records. (If no families were found, it is presumed that this routine is not invoked in step 714 of FIG. 7B.) In overview, the number of family identifiers already found in the records indicated by the potential family list determines how family identifiers are to be set in the new family. There are four primary scenarios, in decreasing order of occurrence:

(1) None of the records has a family identifier set;
(2) One family identifier has been assigned to 2 or more records in the list;
(3) Two family identifiers have been assigned to groups of two or more records in the list; and
(4) Three or more family identifiers have been assigned to groups of 2 or more records in the list.

The various branches of the example flow diagram represent these four scenarios. Steps 2202–2204 correspond to the first scenario; steps 2205–2207 correspond to the second scenario; steps 2208–2210 correspond to the fourth scenario; and steps 2211–2217 correspond to the third scenario. Specifically, in step 2201, the routine determines how many family identifiers (FamIDs) are included in the designated potential family list. In step 2202, if there are no family identifiers found, then the routine continues in step 2203, else continues in step 2205. In step 2203, for each record indicated by the designated potential family list, the routine sets its FamID (family identifier) field to a current family identifier counter. In step 2204, the routine increments the family identifier counter, and then returns.

In step 2205, the routine determines whether the number of family identifiers is one, and, if so, continues in step 2206, else continues in step 2208. In step 2206, the routine retrieves the single family identifier found. In step 2207, the routine then sets the FamID field of each record indicated by the designated potential family list to the retrieved family identifier, and then returns.

In step 2208, the routine locates all records in the Master List that have the same family identifiers as those found and adds them to the designated potential family list. This step insures that other records in a family that have been joined by the designated new record will also be found if the FindIndirectRelations routine did not locate them for any reason. (In another embodiment, it may be desirable to add this step between steps 2206 and 2207 as well.) In step 2209, the routine determines whether there are two family identifiers found, and, if so, continues in step 2211, else continues in step 2210. In step 2210, when there are greater that two family identifiers found, the routine indicates that selection of family(ies) setting needs to be manually performed, and then returns. This disposition is rarely the case, because merging more than two families is both unlikely and very data and application dependent.

In steps 2211 and 2212, the routine determines the two records in the designated potential family list that are joined by the designated new record and that have differing family identifiers. One way to perform this step is by previously indicating in the data records the first time a new family is discovered during the FindIndirectRelations routine processing. Another method for performing this step is to keep the determined records in the order they were found, and then to scan the records in the designated potential family list for the first record that corresponds to each found family identifier. Yet another method for performing this step is to instead perform step 2213 (the comparison) on all of the records of the designated potential family list that already have matching family identifiers with the designated record. Other combinations and methods are possible and contemplated. In step 2213, assuming only two records are compared with the designated record, a configurable set of secondary field values is compared to determine whether the two families should be merged (termed a "marriage") or whether they should remain separate. The degree to which a marriage can automatically occur is dependent on the type of data being managed and the level of tolerance for error of the application that is using the data. Example secondary fields include one or more fields of a SIC code (a Standard Industry Classification that indicates business types, the first two digits indicating a Major Group); the NAICS code, or alternate phone numbers. Other secondary fields could be configured into the system through a standard configuration table mechanism. In step 2214, if the secondary field values match, then the routine continues in step 2215, otherwise continues in step 2217. In step 2215, the routine chooses which of the two determined family identifiers to use (e.g., the most frequently occurring being one such choice). In step 2216, the routine sets the FamID field of all of the records in the designated potential family list to the chosen identifier, and then returns. In step 2217, the routine indicates that the family setting needs to be manually performed (a marriage is not possible), and then returns.

Instances when it does not make sense to merge (marry) two families are more rare, but do occur. For the data set used in the example embodiment, examples include instances in which a generic address common in many cities is present; searches that key off of a toll-free number placed in the Phone field (toll-free numbers are often used to service regions); a same phone number exists with two different area codes in different states; errors in data entry; a company relocates and two unique businesses hold the same address; and a phone number is reassigned by the phone company to a new company, but the data set hasn't yet been updated. Similar examples exist for other data sets.

FIG. 23 shows a table of an example list of data records of different families that result in marriage into a single family. This example is based upon comparing the 2-digit Major Group component of the SIC code as a secondary field. Group 29 represent Petroleum Refining; Group 30 represents Rubber and Plastic Products (hardware); and Group 87 represents Engineering. In the illustrated example, table 2301 contains nine data records. Two families, FamID 51 and 7, have been found and are potentially joined by the new data record (Record 9). FamID 51 includes companies in the Petroleum Refining industry, some of which share a company name or phone number with the new data record. FamID 7 has two companies in the Rubber and Plastic Products industry, which share an address with the new data record. Thus, the new data record represents a company at one location, which location also houses two other (presumed, for these purposes) related companies since the secondary field (e.g., SIC code) values match. In this instance, it then makes sense to marry the two families.

FIG. 24 shows a table of an example list of data records of different families that do not result in a marriage of the families. In this instance, the data in Table 2401 is the same as Table 2301 in FIG. 23, except the secondary field values do not match. Specifically, the two companies having a FamID value of 7 are shown as being part of different industries, the Rubber and Plastic Products industry and the Engineering industry, and thus are not treated as related companies. One skilled in the art will recognize that other results are possible and can be configured based upon the secondary fields chosen.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to other types of data repositories, or record management systems, or even a plurality of such data repositories. One skilled in the art will also recognize that the methods and systems discussed herein are applicable to differing protocols, communication media (optical, wireless, cable, etc.) and devices for interfacing to the DFRMS and for managing the data entry (such as wireless handsets, electronic organizers, personal digital assistants; portable email machines, game machines, pagers, navigation devices such as GPS receivers, etc.).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the invention can be modified, if necessary, to employ methods, systems and concepts of these various patents, applications and publications to provide yet further embodiments of the invention. In addition, those skilled in the art will understand how to make changes and modifications to the methods and systems described to meet their specific requirements or conditions.

What is claimed is:

1. A method in a computer system for indicating direct and indirect relationships among a plurality of data records in a data repository to a designated record, each record having a plurality of data fields with values, comprising:
    determining, from the plurality of data records, a set of records that are directly-related to the designated record, such that at least one data field has a common value in the designated data record and in each of the records in the set;
    using the set of directly-related records, automatically determining from the plurality of data records a potential family of records that includes the set of directly-related records and records that are indirectly related to each other through a plurality of designated data fields;
    adding the designated record to the potential family of records when it is automatically determined that the designated record is not a duplicate of one of the data records in the potential family of records; and
    automatically setting an indicator in each of the data records in the potential family of records to indicate a family relationship between the records.

2. The method of claim 1 wherein the determination of records that are indirectly related to each other comprises determining that a first record shares a value of a first data field in common with a second record but not with a third record and that the second record shares a value of a second field in common with the third record but not with the first record, thereby indicating an indirect relationship between the third record and the first record.

3. The method of claim 2 wherein the determination of records that are indirectly related to each other further comprises determining that the third record shares a values of a third field in common with a fourth record, thereby indicating an indirect relationship between the fourth record and the first record.

4. The method of claim 1 wherein the determination of records that are indirectly related to each other progressively determines all records in the plurality of data records that are indirectly related to each other through the plurality of designated fields as new such records are determined.

5. The method of claim 1, further comprising:
    using the set of directly-related records, automatically determining a second set of directly-related records for at least one of the records in the set; and
    combining the at least one second set with the set of directly-related records to form a primer set to use for automatically determining a potential family of records.

6. The method of claim 1, further comprising determining whether a plurality of family relationships between the records is to be merged into one family relationship.

7. The method of claim 1, further comprising:
    using the indicated at least one family relationship to automatically retrieve a family of data records; and
    using the retrieved data records to automatically determine a set of locations to which an object is to be sent.

8. The method of claim 1, further comprising:
    using the indicated at least one family relationship to automatically retrieve a family of data records; and
    using the retrieved data records to automatically complete a field in a first data record of the retrieved data records based upon a second data record of the retrieved data records.

9. A method in a computer system for indicating a family relationship among a plurality of data records in a data repository to a designated record, each record having a plurality of data fields with values, comprising:
automatically determining a set of data records from the plurality of data records that relate directly to the designated record and data records that relate indirectly to the designated record; and
adding the designated record to the determined set when it is automatically determined that the designated record is not a duplicate of a data record in the determined set; and
automatically associating with each record of the determined set an indication of membership in at least one family relationship.

10. The method of claim 9, further comprising, when a designated record is determined to be the duplicate of the data record, automatically deleting the designated record.

11. The method of claim 10, further comprising automatically first consolidating data fields between the designated record and the determined duplicate data record before automatically deleting the designated record.

12. The method of claim 9 wherein the automatic determination of the set of data records that relate is based upon at least one designated data field.

13. The method of claim 12 wherein the designated data field comprises at least one of a name, an address, and a phone number.

14. The method of claim 12 wherein the value of the designated data field is normalized according to a set of conventions.

15. The method of claim 9 wherein indicators of a plurality of family relationships are associated with the records of the determined set.

16. The method of claim 9 wherein the automatic determination of the set of data records locates all records in the plurality of data records that relate directly to any one of the other records based upon a plurality of designated data fields.

17. The method of claim 9 wherein the automatic determination that the designated record is not a duplicate examines values of a plurality of data fields.

18. The method of claim 17 wherein the plurality of fields includes at least one of a name field, an address, and a phone number field.

19. The method of claim 9, further comprising:
using the indicated at least one family relationship to automatically retrieve a family of data records; and
using the retrieved data records to automatically determine a set of locations to which an object is to be distributed.

20. The method of claim 19 wherein the automatically determined locations are used in a direct mailing process.

21. The method of claim 19 wherein the object is a marketing tool.

22. The method of claim 21 wherein the marketing tool is a sales catalog.

23. The method of claim 19 wherein the object is a product.

24. The method of claim 19 wherein the automatic determination of locations from the family of data records controls the number of duplicate objects being distributed.

25. The method of claim 19 wherein the determining of the locations determines locations that correspond to unique individuals.

26. The method of claim 19 wherein the determining of the locations determines locations that correspond to unique addresses.

27. The method of claim 9, further comprising:
using the indicated at least one family relationship to automatically retrieve a family of data records; and
using the retrieved data records to automatically determine all of the data records that relate to a specified value of a designated field.

28. The method of claim 27 wherein the specified value is a name.

29. The method of claim 27 wherein the specified value is an address.

30. A computer-readable memory medium containing instructions for controlling a computer process to indicate a family relationship among a plurality of data records in a data repository to a designated record, each record having a plurality of data fields with values, by:
automatically determining a set of data records from the plurality of data records that relate directly to the designated record and data records that relate indirectly to the designated record; and
adding the designated record to the determined set when it is automatically determined that the designated record is not a duplicate of a data record in the determined set; and
automatically associating with each record of the determined set an indication of membership in at least one family relationship.

31. The computer-readable memory medium of claim 30, further comprising instructions that, when a designated record is determined to be the duplicate of the data record, automatically delete the designated record.

32. The computer-readable memory medium of claim 31, further comprising instructions that automatically first consolidate data fields between the designated record and the determined duplicate data record before automatically deleting the designated record.

33. The computer-readable memory medium of claim 30 wherein the automatic determination of the set of data records that relate is based upon a plurality of designated data fields.

34. The computer-readable memory medium of claim 33 wherein the values of the designated data fields are normalized according to a set of conventions.

35. The computer-readable memory medium of claim 30, further comprising instructions that control the computer processor by:
using the indicated at least one family relationship to automatically retrieve a family of data records; and
using the retrieved data records to automatically determine a set of locations to which an object is to be distributed.

36. The computer-readable memory medium of claim 35 wherein the automatically determined locations are used in a direct mailing process.

37. The computer-readable memory medium of claim 35 wherein the automatic determination of locations from the family of data records controls the number of duplicate objects being distributed.

38. The computer-readable memory medium of claim 30, further comprising instructions that control the computer processor by:
using the indicated at least one family relationship to automatically retrieve a family of data records; and
using the retrieved data records to automatically determine all of the data records that relate to a specified value of a designated field.

39. The computer-readable memory medium of claim 38 wherein the specified value is a name.

40. The computer-readable memory medium of claim 38 wherein the specified value is an address.

41. A record management system comprising:

automatic de-duplication engine that, upon receiving a designated data record, automatically determines a set of data records from a plurality of data records in a data repository that relate directly to the designated record and data records that relate indirectly to the designated record;

adds the designated record to the determined set when it is automatically determined that the designated record is not a duplicate of a data record in the determined set; and automatically associates with each record of the determined set an indication of a family of related data records.

42. The record management system of claim 41, further comprising a query engine that retrieves a set of data records that indicated a designated family of related data records.

43. The record management system of claim 42 further comprising a process that uses the retrieved data records to automatically determine a set of targets to which to distribute an object.

44. The record management system of claim 43 wherein the process is a direct mail application.

45. The record management system of claim 42 further comprising a process that uses the retrieved data records to automatically complete data values in at least one of the retrieved data records.

46. The record management system of claim 41 wherein the automatic de-duplication engine automatically determines whether the designated record is a duplicate of a second record and deletes one of the designated record and the second record when the designated record is the duplicate of the second record.

47. The record management system of claim 46 wherein the automatic de-duplication engine automatically first consolidates values of the designated record and the second record prior to deletion.

48. The record management system of claim 41 wherein the automatic determination of the set of data records that relate includes identifying data records that relate indirectly through a plurality of levels of indirection.

49. The record management system of claim 41, further comprising a table that controls the determination of whether the designated data record is a duplicate data record.

50. The record management system of claim 41, her comprising a table of data value conventions that are used to normalize values in the designated data record.

* * * * *

UNITED STATES PATENT AND TRADEMARK OFFICE
CERTIFICATE OF CORRECTION

PATENT NO. : 6,934,714 B2 Page 1 of 1
DATED : August 23, 2005
INVENTOR(S) : Kelly Meinig It is certified that error appears in the above-identified patent and that said Letters Patent is hereby corrected as shown below:

Column 22,
Line 22, "her" should read -- further --.

Signed and Sealed this

Twentieth Day of December, 2005

JON W. DUDAS
*Director of the United States Patent and Trademark Office*